(12) United States Patent
Liang et al.

(10) Patent No.: US 10,355,459 B2
(45) Date of Patent: Jul. 16, 2019

(54) BUSBAR ASSEMBLY AND CABINET HAVING THE SAME

(71) Applicants: LITE-ON ELECTRONICS (GUANGZHOU) LIMITED, Guangzhou (CN); LITE-ON TECHNOLOGY CORP., Taipei (TW)

(72) Inventors: Wei-Hao Liang, Taipei (TW); Sheng-Chan Tu, Taipei (TW); Po-Jen Hsu, Taipei (TW); Yi-Wei Chen, Taipei (TW); Wen-Chi Chen, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 64 days.

(21) Appl. No.: 15/595,100

(22) Filed: May 15, 2017

(65) Prior Publication Data

US 2018/0048127 A1    Feb. 15, 2018

(30) Foreign Application Priority Data

Aug. 15, 2016   (TW) .............................. 105212356 U

(51) Int. Cl.
| | |
|---|---|
| H02B 1/20 | (2006.01) |
| H02G 5/00 | (2006.01) |
| H02B 1/21 | (2006.01) |
| H02G 5/02 | (2006.01) |
| H02G 5/06 | (2006.01) |

(52) U.S. Cl.
CPC .................. *H02B 1/20* (2013.01); *H02G 5/00* (2013.01); *H02B 1/207* (2013.01); *H02B 1/21* (2013.01); *H02G 5/025* (2013.01); *H02G 5/06* (2013.01)

(58) Field of Classification Search
CPC . H02B 1/20; H02B 1/207; H02B 1/21; H02G 5/00; H02G 5/025; H02G 5/06; H01R 44/66
See application file for complete search history.

(56) References Cited

U.S. PATENT DOCUMENTS

| | | | |
|---|---|---|---|
| 2006/0120026 A1* | 6/2006 | Wiant ...................... | H02B 1/21 361/614 |
| 2014/0138149 A1* | 5/2014 | Manhart .................. | H02B 1/21 174/71 B |

* cited by examiner

*Primary Examiner* — Pete T Lee
(74) *Attorney, Agent, or Firm* — Rosenberg, Klein & Lee

(57) ABSTRACT

In a busbar assembly, a first busbar subassembly includes a first transmission unit having a first transmission busbar with a uniform width, and a first output unit having a first output busbar with a uniform width. One of the first transmission unit and the first output unit has a bent structure with a bend line perpendicular to a line of a lengthwise direction thereof. A second busbar subassembly includes a second transmission unit having a second transmission busbar with a uniform width, and a second output unit having a second output busbar with a uniform width. One of the second transmission unit and the second output unit has a bent structure with a bend line perpendicular to a line of a lengthwise direction thereof.

6 Claims, 22 Drawing Sheets

BUSBAR ASSEMBLY AND CABINET HAVING THE SAME

CROSS-REFERENCE TO RELATED APPLICATION

This application claims priority to Taiwanese Patent Application No. 105212356, filed on Aug. 15, 2016.

FIELD

The disclosure relates to a busbar assembly, and more particularly to a busbar assembly for transmitting an input current of a power supply unit, and a cabinet having the busbar assembly.

BACKGROUND

Generally, an existing centralized power supply module for a server cabinet, or a conventional busbar assembly for a power distribution unit includes a plurality of copper busbars. Each copper busbar is in the form of a broad plate that has a large area to allow passage of high currents and effective dissipation of heat.

In conventional busbar assemblies, two copper busbars are interconnected in various fashions in order to vary directions of current flows. However, processing of the copper busbars includes bending operations to shape the copper busbars, and requires relatively large area copper plates, thus increasing costs due to material redundancy. Further, owing to the increasing requirement of high power density, the existing server cabinet may not have sufficient interior space for accommodation of busbars, and difficulty may increase in assembly and maintenance. Because server cabinets with compact layouts become a significant demand, each copper busbar has to be tailored after being bent in order to be accommodated in the limited space of the server cabinet and to be inter-connectable with another busbar. Manufacturing costs are increased due to the need of tailoring subsequent to bending (the bending operations) and formation of substantial scrap resulting from tailoring.

Referring to FIGS. 1 and 2, the conventional busbar assembly 9 includes two busbar subassemblies 91, 92. Because the busbar subassemblies 91, 92 are structurally identical, only one of the busbar subassemblies 91, 92 is described hereinafter. The busbar subassembly 91 includes a first copper busbar 911 and a second copper busbar 912 attached to the first copper busbar 911. The first copper busbar 911 is a horizontally-arranged flat plate, formed in rectangular shape. The second copper busbar 912 has a horizontally-arranged flat plate portion 913 attached to a top surface of the first copper busbar 911, and a vertically-arranged flat plate portion 914 bending downwardly from the horizontally-arranged plate portion 913. During manufacture of the second copper busbar 912, a rectangular copperplate 90 is first cut to form a semi-finished product 901 and a certain amount of scrap waste 902. Subsequently, the semi-finished product 901 is subjected to a bending process, wherein bending the semi-finished busbar 901 along a predetermined bending line 903 produces a plate portion 904 that is bent perpendicularly from a plate portion 905, thereby forming the second copper busbar 912. The bending line 903 is oblique to a lengthwise direction of either one of the plate portions 904, 905 and formed at a position where the plate portions 904, 905 meet each other. Manufacturing the second copper busbar 912 as such results in an increased cost because of the additionally needed cutting process, which produces a large amount of scrap.

SUMMARY

Therefore, an object of the disclosure is to provide a busbar assembly that can be processed through an efficient use of metal plate material, thus reducing material and fabrication costs.

According to the disclosure, a busbar assembly includes a first busbar subassembly and a second busbar assembly.

The first busbar subassembly includes a first transmission unit and a first output unit. The first transmission unit includes at least one first transmission busbar that is elongated lengthwise along a left-right direction and that lies in a horizontal plane. The at least one first transmission busbar has a uniform width. The first output unit is connected to the at least one first transmission busbar and includes a first output busbar that is elongated lengthwise along a front-rear direction and that lies in a vertical plane. The first output busbar has a uniform width. One of the first transmission unit and the first output unit has a bent structure formed with a bend line perpendicular to a line of the lengthwise direction thereof.

The second busbar subassembly includes a second transmission unit and a second output unit. The second transmission unit is spaced apart from the first transmission unit in a top-bottom direction, and includes at least one second transmission busbar that is elongated lengthwise along the left-right direction and that lies in a horizontal plane. The at least one second transmission busbar has a uniform width. The second output unit is connected to the at least one second output busbar, and includes a second output busbar that is elongated lengthwise along the front-rear direction and that lies in a vertical plane. The second output busbar has a uniform width. One of the second transmission unit and the second output unit has a bent structure formed with a bend line perpendicular to a line of the lengthwise direction.

Another object of the present disclosure is to provide a cabinet that includes a busbar assembly which can be processed through an efficient use of metal plate material, thus reducing material and fabrication costs.

According to another aspect of the present disclosure, a cabinet includes a cabinet body, two main busbars and a centralized power supply module.

The cabinet body has an accommodating space opening at a front end of the cabinet body.

The main busbars are disposed in the accommodating space in proximity to a rear end of the cabinet body and connected to the cabinet body. Each of the main busbars is elongated lengthwise along a top-bottom direction.

The centralized power supply module is disposed in the accommodating space and connected to the cabinet body. The centralized power supply module includes a busbar assembly that includes a first busbar subassembly and a second busbar subassembly. The first busbar subassembly includes a first transmission unit and a first output unit. The first transmission unit includes at least one first transmission busbar that is elongated lengthwise along a left-right direction, that lies in a horizontal plane, and that has a uniform width. The first output unit is connected to the at least one first transmission busbar and includes a first output busbar that is elongated lengthwise along a front-rear direction, that lies in a vertical plane, and that has a uniform width. The first output busbar is electrically coupled to one of the main busbars. One of the first transmission unit and the first output unit has a bent structure provided with a bend line perpendicular to a line of a lengthwise direction thereof. The second busbar subassembly includes a second transmission unit and a second output unit. The second transmission unit is disposed spaced apart from the first transmission unit in the top-bottom direction, and includes at least one second transmission busbar that is elongated lengthwise along the left-right direction, that lies in a horizontal plane, and that has a uniform width. The second output unit is connected to the at least one second transmission busbar, and includes a second output busbar that is elongated lengthwise along the front-rear direction, that lies in a vertical plane, and that has a uniform width. The second output busbar is electrically coupled to another one of the main busbars. One of the second transmission unit and the second output unit has a bent structure provided with a bend line perpendicular to a line of a lengthwise direction thereof.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
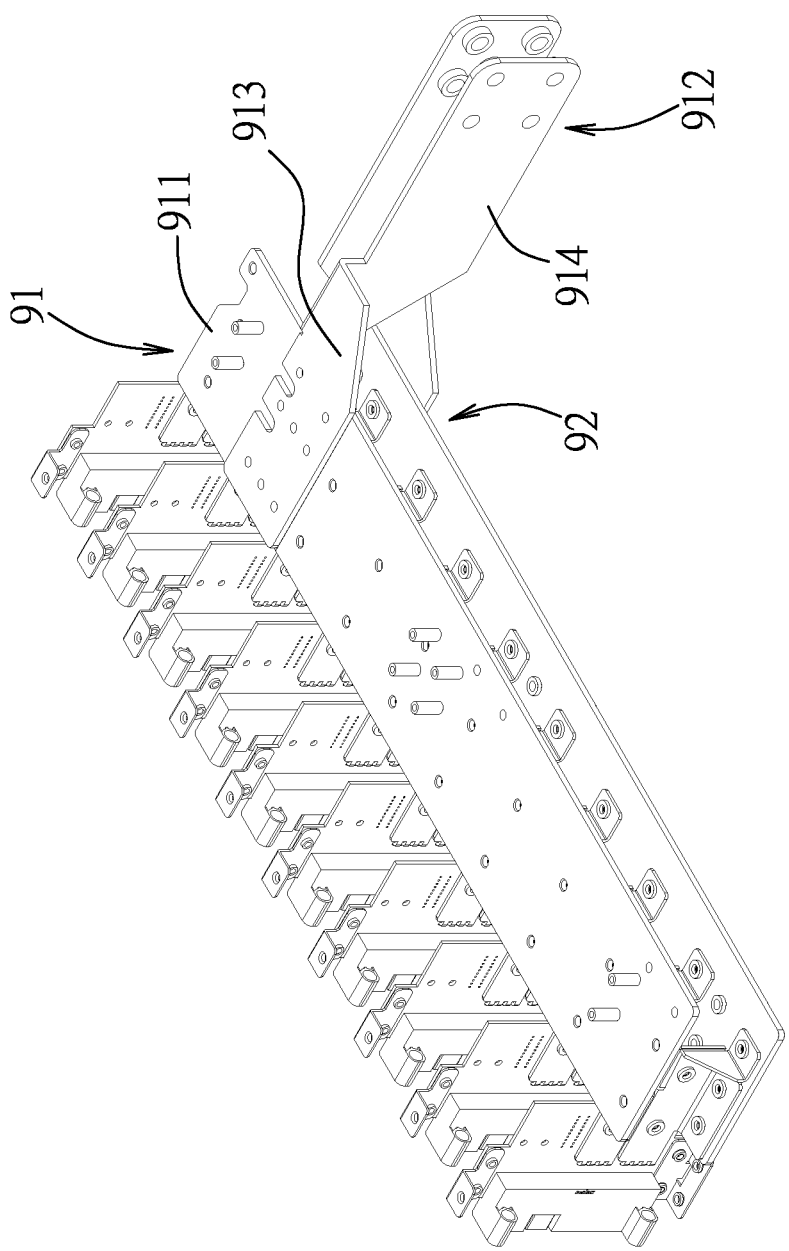
FIG. 1 is a perspective view of a conventional busbar assembly.
Figure 2:
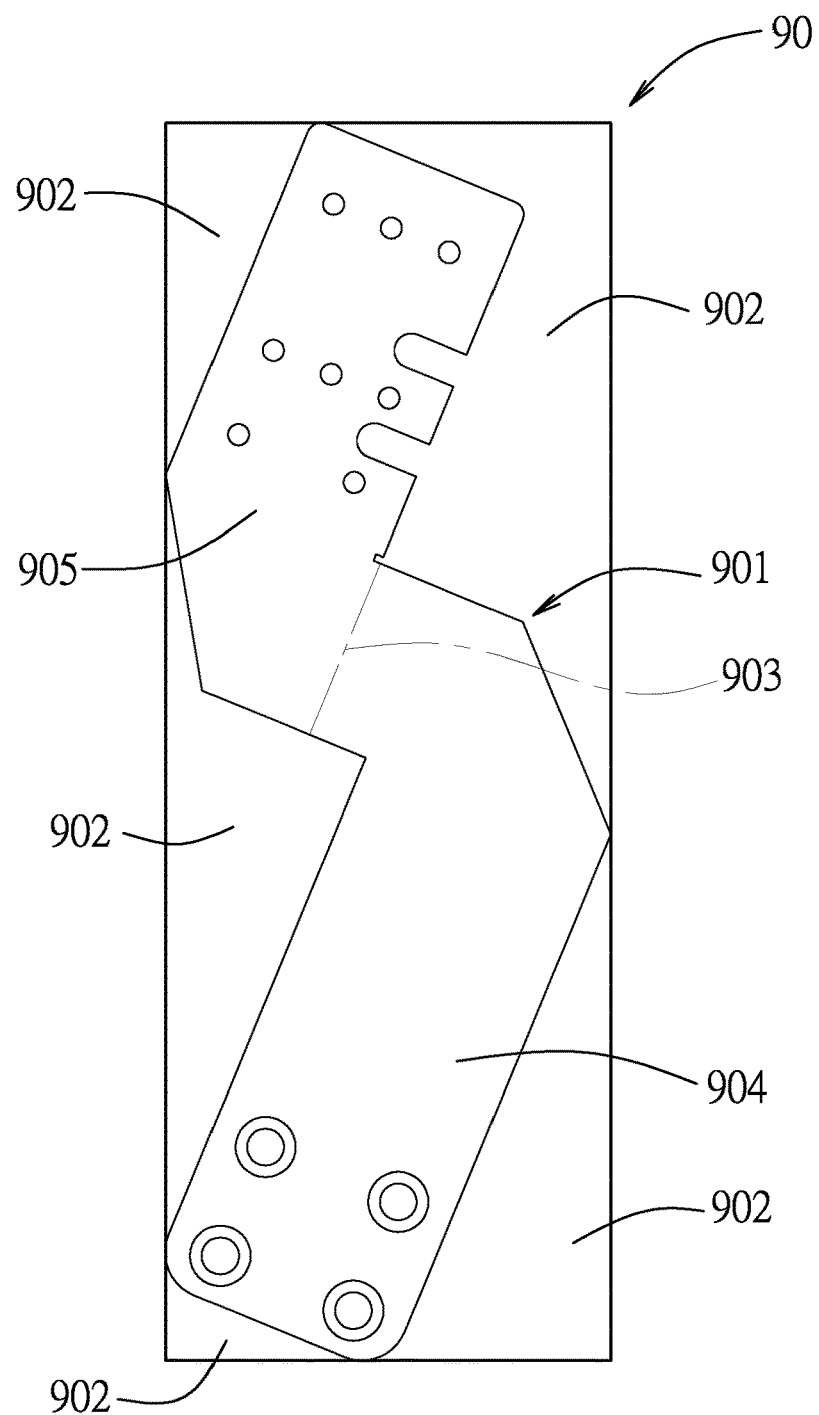
FIG. 2 is a top view of the conventional busbar assembly in a semi-finished form with redundant materials.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
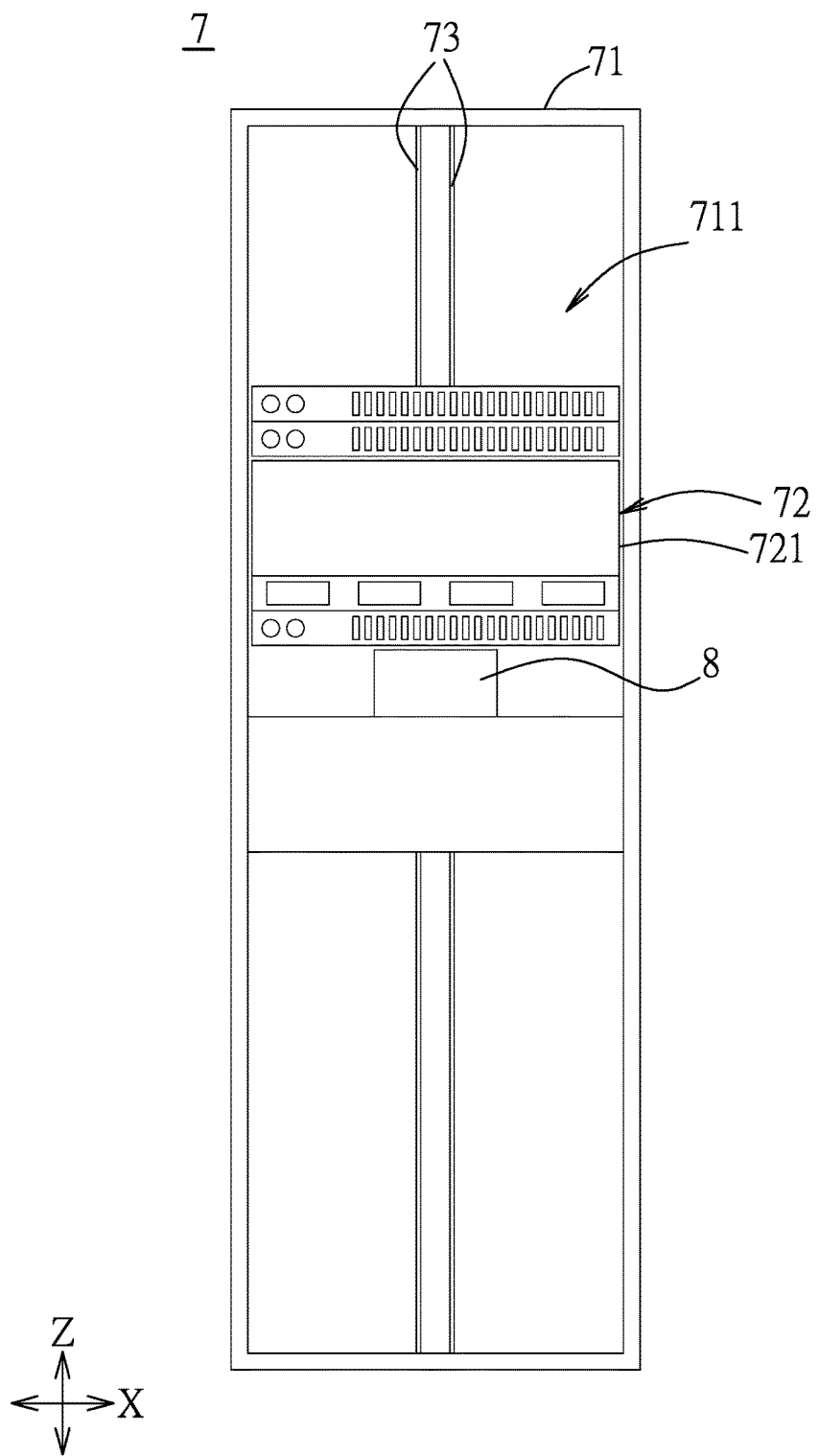
FIG. 3 is a front view of a cabinet according to a first embodiment of the present disclosure.
Figure 4:
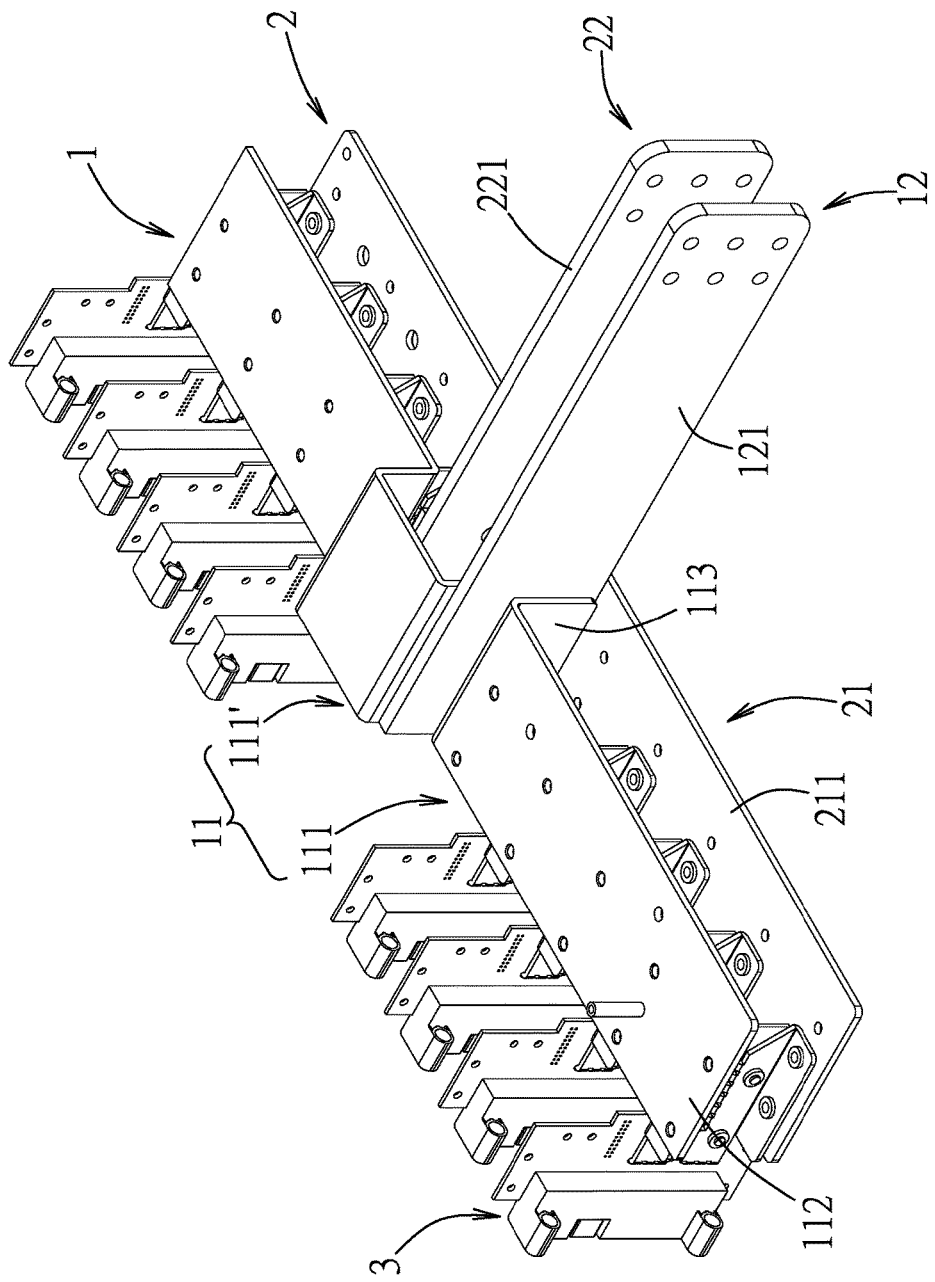
FIG. 4 is a perspective view of a busbar assembly of the first embodiment.

Referring to FIGS. 3 and 4, a cabinet 7 according to a first embodiment of the present disclosure usable for electrical connection with at least one server 8 is illustrated. The cabinet 7 includes a cabinet body 71, a centralized power supply module 72 and two main busbars 73. The cabinet body 71 has an accommodating space 711 opening at a front end of the cabinet body 71. The centralized power supply module 72 is disposed in the accommodating space 711, and includes a box 721 fixedly connected to the cabinet body 71, and a busbar assembly 100 disposed in the box 721. Each main busbar 73 is elongated lengthwise along a top-bottom direction (Z). The two main busbars 73 are disposed in the accommodating space 711 in proximity to a rear end of the cabinet body 71 and are fixedly connected to the cabinet body 71. The two main busbars 73 are parallel with each other and are electrically coupled to the busbar assembly 100. The busbar assembly 100 is electrically coupled to a plurality of power supply units (PSU) (not shown) to transmit high currents from the power supply units to the two main busbars 73. When the server 8 is electrically coupled to the two main busbars 73, the server 8 can receive the high currents through the main busbars 73.

Figure 5:
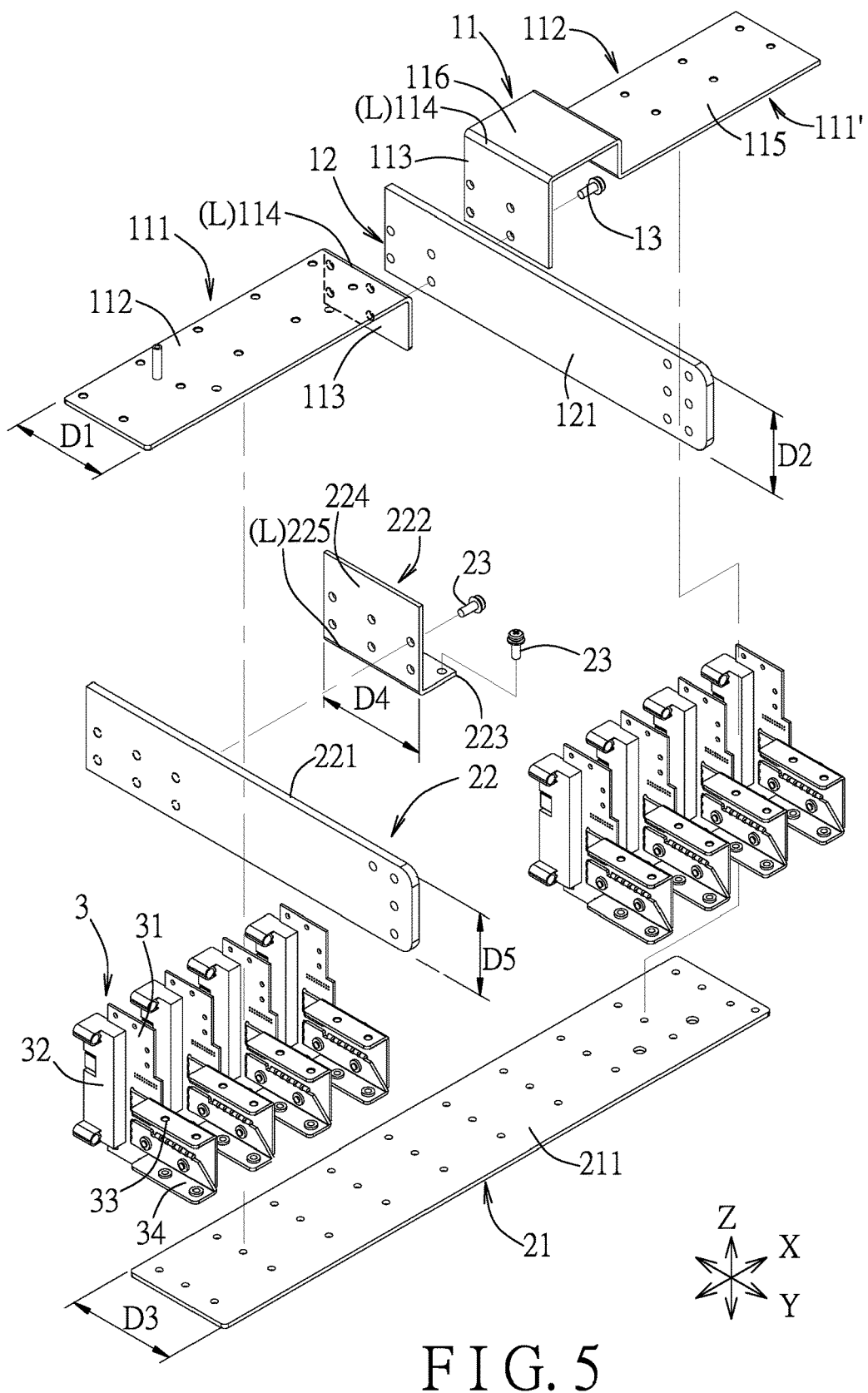
FIG. 5 is an exploded perspective view of FIG. 4.

Referring to FIGS. 4 and 5, the busbar assembly 100 includes a first busbar subassembly 1, a second busbar subassembly 2 and a plurality of electronic connector assemblies 3.

Figure 6:
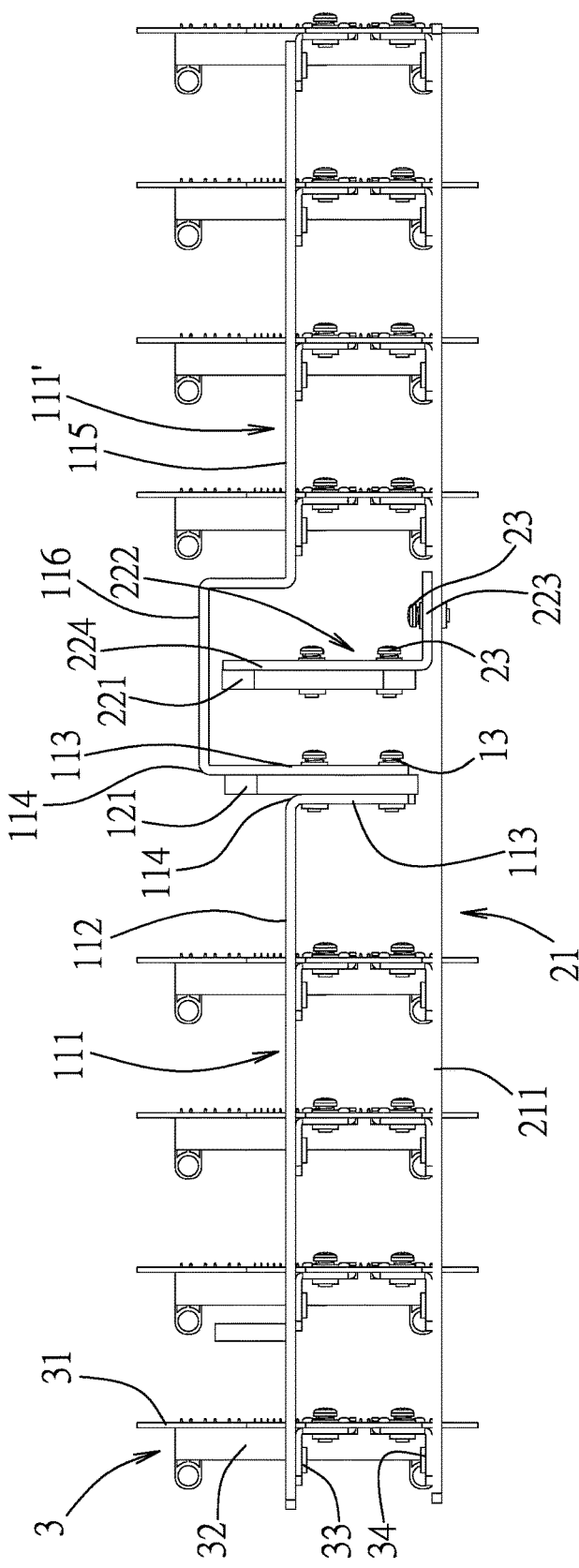
FIG. 6 is a rear view of FIG. 4.

Referring to FIG. 6, in combination with FIGS. 4 and 5, the first busbar subassembly 1 includes a first transmission unit 11 and a first output unit 12. The first transmission unit 11 includes two first transmission busbars 111, 111' spaced apart from each other in the left-right direction (X). Each of first transmission busbars 111, 111' has an L-shaped bent structure formed with a bend line (L) perpendicular to a line of the lengthwise direction thereof. The first transmission busbar 111 includes a first horizontal plate portion 112 and a first vertical plate portion 113. The first horizontal plate portion 112 of the first transmission busbar 111 is rectangular, extends lengthwise in the left-right direction (X), lies in a horizontal plane, and has a short side 114, where the bend line (L) is formed. The first horizontal plate portion 112 of the first transmission busbar 111' extends lengthwise in the left-right direction (X), lies in a horizontal plane, and includes a flat plate portion 115 and a raised plate portion 116 raised upwardly from a side of the flat plate portion 115. The raised plate portion 116 has the short side 114, where the bend line (L) perpendicular to a line of the lengthwise direction is formed. The short sides 114 of the two first transmission busbars 111, 111' are proximate to each other. The first vertical plate portions 113 of the first transmission busbars 111, 111' bend downwardly and respectively from the short sides 114.

In this embodiment, each first transmission busbar 111, 111' is a one-piece structure formed by bending an elongate rectangular copper plate. The first horizontal plate portion 112 and the first vertical plate portion 113 of each of the first transmission busbars 111, 111' have the uniform width (D1) in the front-rear direction (Y).

The first output unit 12 includes a rectangular first output busbar 121 that is elongated lengthwise along a front-rear direction (Y) and that lies in a vertical plane. The first output busbar 121 is a vertical rectangular plate that is made from a rectangular copper plate and that has the uniform width (D2) in the top-bottom direction (Z). The first vertical plate portions 113 of the two first transmission busbars 111, 111' are respectively connected to two opposite vertical sides (i.e., left and right sides) of the first output busbar 121, and the first output busbar 121 projects rearward (i.e. toward the rear end of the cabinet body 71) and outwardly from the first transmission busbars 111, 111'. The first vertical plate portions 113 of the two first transmission busbars 111, 111' are secured to the first output busbar 121 by a plurality of fasteners 13 (e.g. screw bolts, only one is shown in FIG. 5), so that the overlapping regions of the first vertical plate portions 113 of the two first transmission busbars 111, 111' and the first output busbar 121 are electrically coupled to each other.

The second busbar subassembly 2 includes a second transmission unit 21 and a second output unit 22. The second transmission unit 21 includes a second transmission busbar 211 disposed below the two first transmission busbars 111, 111' in a spaced apart manner. The second transmission busbar 211 is a horizontal plate that is made from a copper plate, lies in a horizontal plane, has the uniform width (D3) in the front-rear direction (Y), and is elongated lengthwise along the left-right direction (X). The second output unit 22 includes a rectangular second output busbar 221 that is elongated lengthwise along the front-rear direction (Y) and that lies in a vertical plane, and a second output adaptor busbar 222.

The second output adaptor busbar 222 is bent into an L-shape, and includes an adaptor horizontal plate portion 223 and an adaptor vertical plate portion 224.

The adaptor horizontal plate portion 223 is connected to a top surface of the second transmission busbar 211 and has a lateral side 225 that extends along the front-rear direction (Y), where the bend line (L) perpendicular to a line of the lengthwise direction of the second output adaptor busbar 222 is formed. The adaptor vertical plate portion 224 bends upwardly from the lateral side 225. In this embodiment, the second output adaptor busbar 222 is located beneath the raised plate portion 116. The adaptor horizontal plate portion 223 is secured to the second transmission busbar 211 by a plurality of fasteners 23 (only one is shown in FIG. 5), so that the overlapping regions of the adaptor horizontal plate portion 223 and the second transmission busbar 211 are electrically coupled to each other. The second output adaptor busbar 222 is made in a one-piece form by bending a rectangular copper plate. Therefore, each of the adaptor horizontal plate portion 223 and the adaptor vertical plate portion 224 has a uniform width (D4) in the front-rear direction (Y).

The second output busbar 221 is a vertical plate made from a copper plate and having a uniform width (D5) in the top-bottom direction (Z). The second output busbar 221 is connected to a side of the adaptor vertical plate portion 224, and projects rearward (i.e. toward the rear end of the cabinet body 71) and outwardly from the second transmission busbar 211. The second output busbar 221 is secured to the adaptor vertical plate portion 224 by a plurality of fasteners 23 (only one is shown in FIG. 5), so that the overlapping regions of the second output busbar 221 and the adaptor vertical plate portion 224 are electrically coupled to each other.

The electronic connector assemblies 3 are located between each of the first transmission busbars 111, 111' and the second transmission busbar 211, and are spaced apart from each other along the left-right direction (X). Each electronic connector assembly 3 includes a circuit board 31, an electrical connector 32 disposed on the circuit board 31, a first conductive plate 33 connected to one side of the circuit board 31, and a second conductive plate 34 connected to the circuit board 31 and spaced-apart from the first conductive plate 33. The connectors 32 are located in proximity to the front end of the cabinet body 71 for the insertion connection of the power supply units. The first conductive plates 33 are electrically coupled to the first transmission busbars 111, 111'. The second conductive plates 34 are electrically coupled to the second transmission busbar 211. As such, the positive currents from outputs of the power supply units are transmitted to the first transmission busbars 111, 111' through the electrical connectors 32, the circuit boards 31 and the first conductive plates 33. The negative currents from outputs of the power supply units are transmitted to the second transmission busbar 211 through the electrical connectors 32, the circuit boards 31 and the second conductive plates 34.

Because the busbar width is directly proportional to the amount of the current flow, the busbar width should be properly predetermined and uniform for ensuring good electrical conductivity. As the first transmission busbars 111, 111', the first output busbar 121, the second transmission busbar 211, and the second output busbar 221 are so designed as to have uniform widths, they can transmit a large current with efficient electrical conduction without encountering any problem due to width disuniformity of the busbars. On the other hand, when the busbar has a fewer number of bent portions, the busbar has a better electrical conductivity. Because only one of the first transmission unit 11 and the first output unit 12 has the bent structure, and because only one of the second transmission unit 21 and the second output unit 22 has the bent structure, not only may the amount of busbar bends be reduced, but the processing of the busbars may also be simplified.

In this embodiment, without the need to reduce the uniform width (D5) by tailoring, the second output busbar 221 can be suitably mounted between the second transmission busbar 211 and the first transmission busbar 111'. By virtue of the raised plate portion 116 of the first transmission busbar 111' that forms a relatively large gap from the second transmission busbar 211, the second output busbar 221 and the adaptor vertical plate portion 224 can be directly secured to each other between the raised plate portion 116 and the second transmission busbar 211. Accordingly, the second output busbar 221 can maintain its original uniform width (D5) to ensure an efficient electrical conduction when transmitting high currents.

The circuit boards 31 and the electrical connectors 32 are disposed substantially in a vertical manner. Some of the first conductive plates 33 are fastened to a bottom surface of the first horizontal plate portion 112 of the first transmission busbar 111. The remaining first conductive plates 33 are fastened to a bottom surface of the flat plate portion 115 of the first transmission busbar 111'. Accordingly, the first conductive plates 33 are electrically coupled to the first transmission busbars 111, 111' for transmitting the positive currents. The second conductive plates 34 are secured to the top surface of the second transmission busbar 211. As such, the second conductive plates 34 are electrically coupled to the second transmission busbar 211 for transmitting the negative currents.

By virtue of the first transmission busbars 111, 111' having the bent structure, the first output busbar 121 may be connected at about a central position of the first transmission unit 11 (i.e. the junction of the first transmission busbars 111, 111'). Accordingly, the first output busbar 121 may be fastened to one of the main busbars 73 at the rear end of the cabinet body 71 (see FIG. 3) so as to be electrically coupled thereto. With the bent structure of the second output adaptor busbar 222, the second output busbar 221 may be connected at about a central position of the second transmission unit 21. Through this, the second output busbar 221 may be fastened to another main busbar 73 at the rear end of the cabinet 71 so as to be electrically coupled thereto.

While in this embodiment the first busbar subassembly 1 includes two first transmission busbars 111, 111', in an alternative embodiment, the first busbar subassembly 1 may include only one of the first transmission busbars 111, 111'.

Because the first vertical plate portion 113 of each of the first transmission busbars 111, 111', the raised plate portion 116 of the first transmission busbar 111', and the second output adaptor busbar 222 are all formed by directly bending copper plates without employing a cutting process, and because the widths of the first transmission busbars 111, 111', the first output busbar 121, the second transmission busbar 211, the second output adaptor busbar 222 and the second output busbar 221 are uniform throughout their lengths, the waste material cost due to the formation of scraps during cutting may be reduced, and the fabrication costs may be saved. The raw copper material for the busbars may be utilized efficiently.

Figure 7:
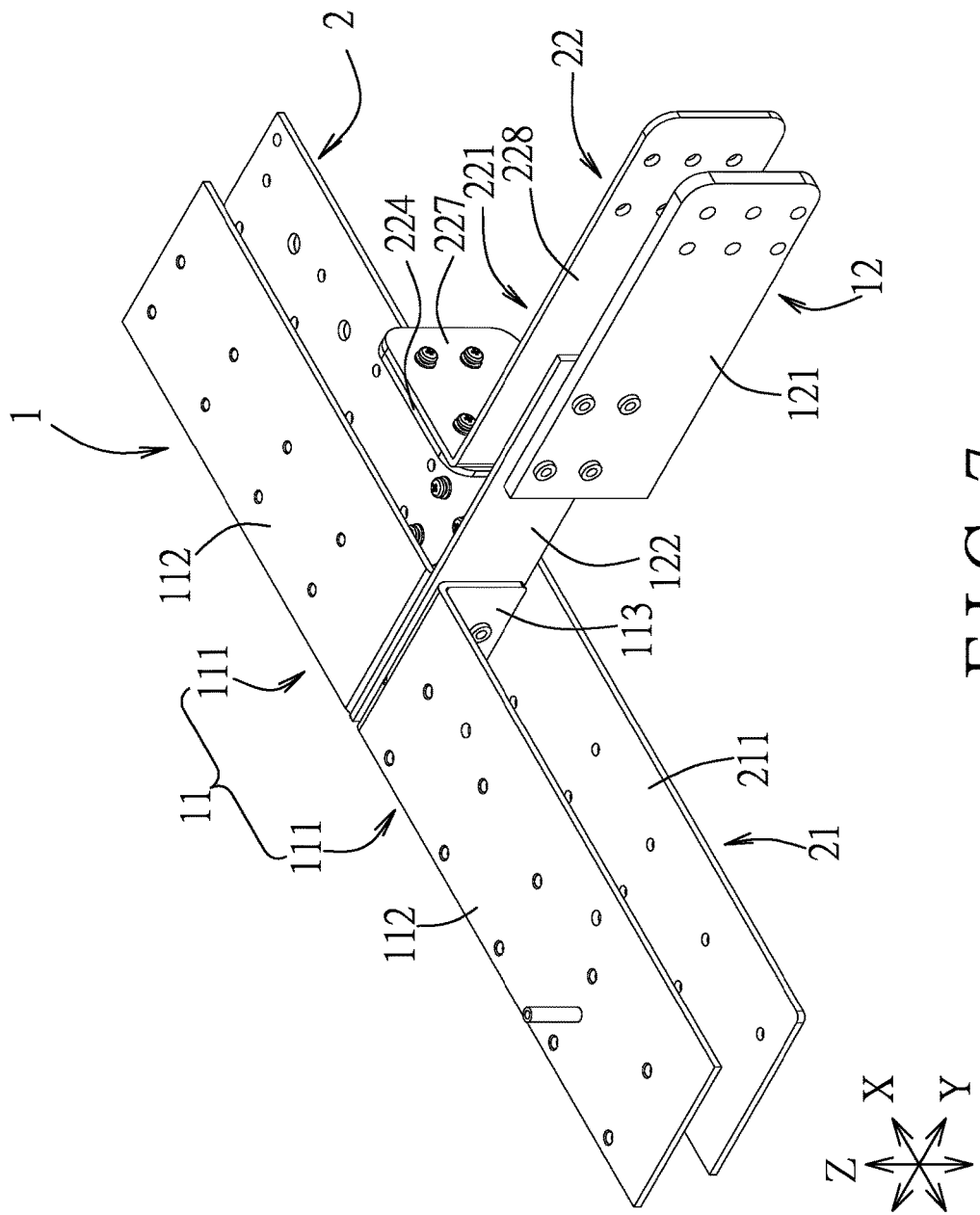
FIG. 7 is a perspective view of a busbar assembly according to a second embodiment of the present disclosure.
Figure 8:
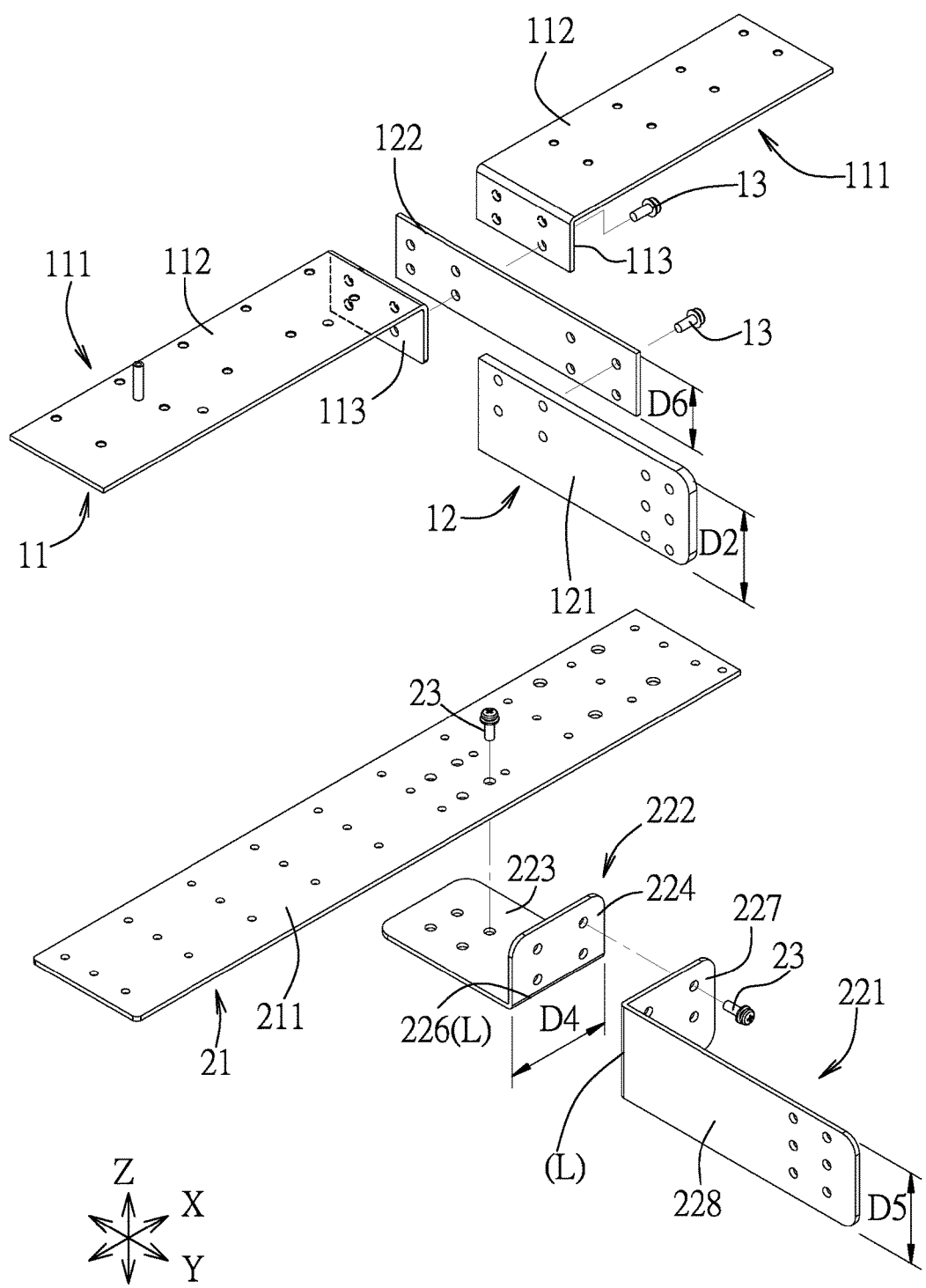
FIG. 8 is an exploded perspective view of FIG. 7.
Figure 9:
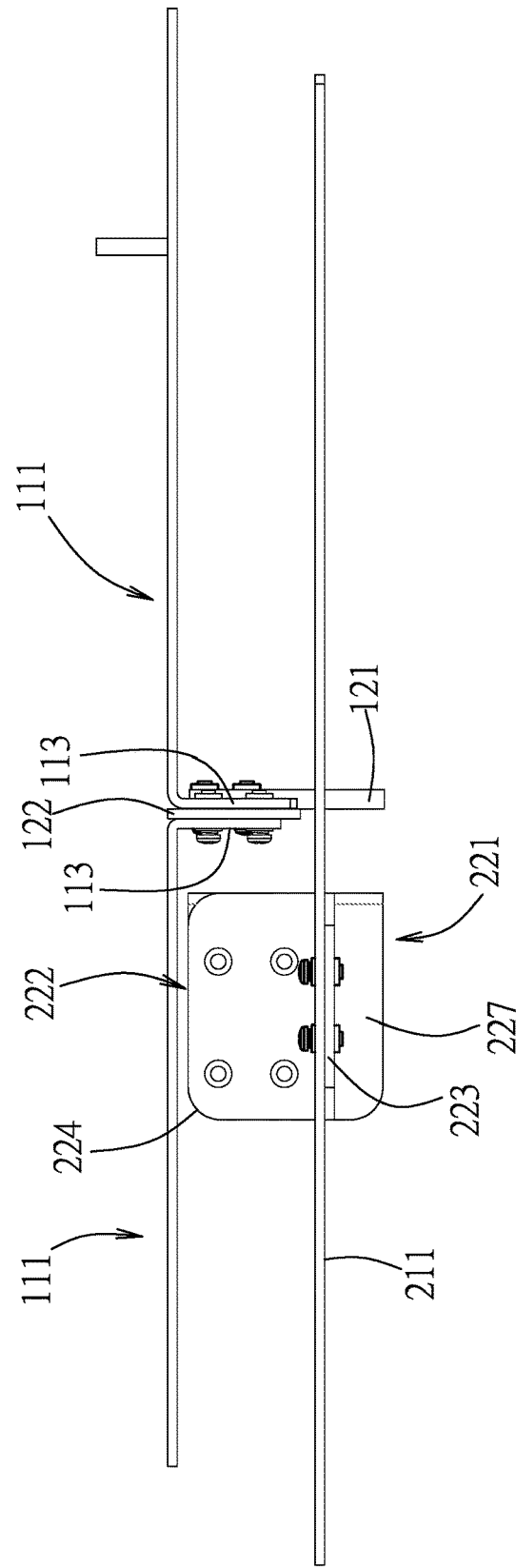
FIG. 9 is a front view of FIG. 7.

FIGS. 7 to 9 illustrate a busbar assembly 200 according to a second embodiment of the present disclosure, which is generally similar to the first embodiment. The differences of the second embodiment are described in detail as follows. The first transmission unit 11 includes two identical horizontal first transmission busbars 111. The first output unit 12 further includes a connecting busbar 122 that lies in a vertical plane, is elongated lengthwise along the front-rear direction (Y), and is made from a copperplate. The connecting busbar 122 has a uniform width (D6) in the top-bottom direction (Z). In this embodiment, the width (D6) of the connecting busbar 122 is smaller than the width (D2) of the first output busbar 121. The first vertical plate portions 113 of the two first transmission busbars 111 are respectively connected to two opposite vertical sides of the connecting busbar 122. The connecting busbar 122 projects rearwardly and outwardly from the two first transmission busbars 111. Unlike the first embodiment, in this embodiment, the first vertical plate portions 113 of the two first transmission busbars 111 are secured to the connecting busbar 122, instead of securing to the first output busbar 121. The securing method is similar to that used in the first embodiment. The first output busbar 121 is also connected to the connecting busbar 122 in the same manner as the first vertical plate portions 113, but at a rear position spaced apart from the two first transmission busbars 111.

The adaptor horizontal plate portion 223 is secured to a bottom surface of the second transmission busbar 211 by a plurality of the fasteners 23 (only one is shown in FIG. 8), and has a rear end 226 distal from the second transmission busbar 211, where a bend line (L) perpendicular to the lengthwise direction of the adaptor horizontal plate portion 223 is formed. The adaptor vertical plate portion 224 bends upwardly from the rear end 226. The adaptor horizontal and vertical plate portions 223, 224 have a uniform width (D4) in the left-right direction (X).

The second output busbar 221 is bent into an L-shape, and includes a vertical second coupling plate portion 227 connected to the adaptor vertical plate portion 224, and a vertical second extension plate portion 228 bending from the vertical second coupling plate portion 227 and extending rearward away from the adaptor busbar 222. In this embodiment, the vertical second coupling plate portion 227 is secured to the adaptor vertical plate portion 224, so that they are electrically coupled to each other. The second output busbar 221 is made from a rectangular copper plate by a bending process. The vertical second coupling plate portion 227 and the vertical second extension plate portion 228 have a uniform width (D5) in the top-bottom direction (Z).

By virtue of the connection of the adaptor busbar 222 with the second transmission busbar 211 and the second output busbar 221, the adaptor vertical plate portion 224 and the second output busbar 221 are not required to be accommodated between the second transmission busbar 211 and one of the two first transmission busbars 111. Accordingly, the first horizontal plate portions 112 of the two first transmission busbars 111 can be coplanar in a horizontal plane. Further, by virtue of the width (D6) of the connecting busbar 122 being smaller than the width (D2) of the first output busbar 121, the gap between the second transmission busbar 211 and the first horizontal plate portions 112 of the two first transmission busbars 111 may be reduced. As a result, the first and second transmission units 11, 21 of the busbar assembly 200 may be disposed in a relatively small and limited space of the cabinet body 71 along the top-bottom direction (Z).

Figure 10:
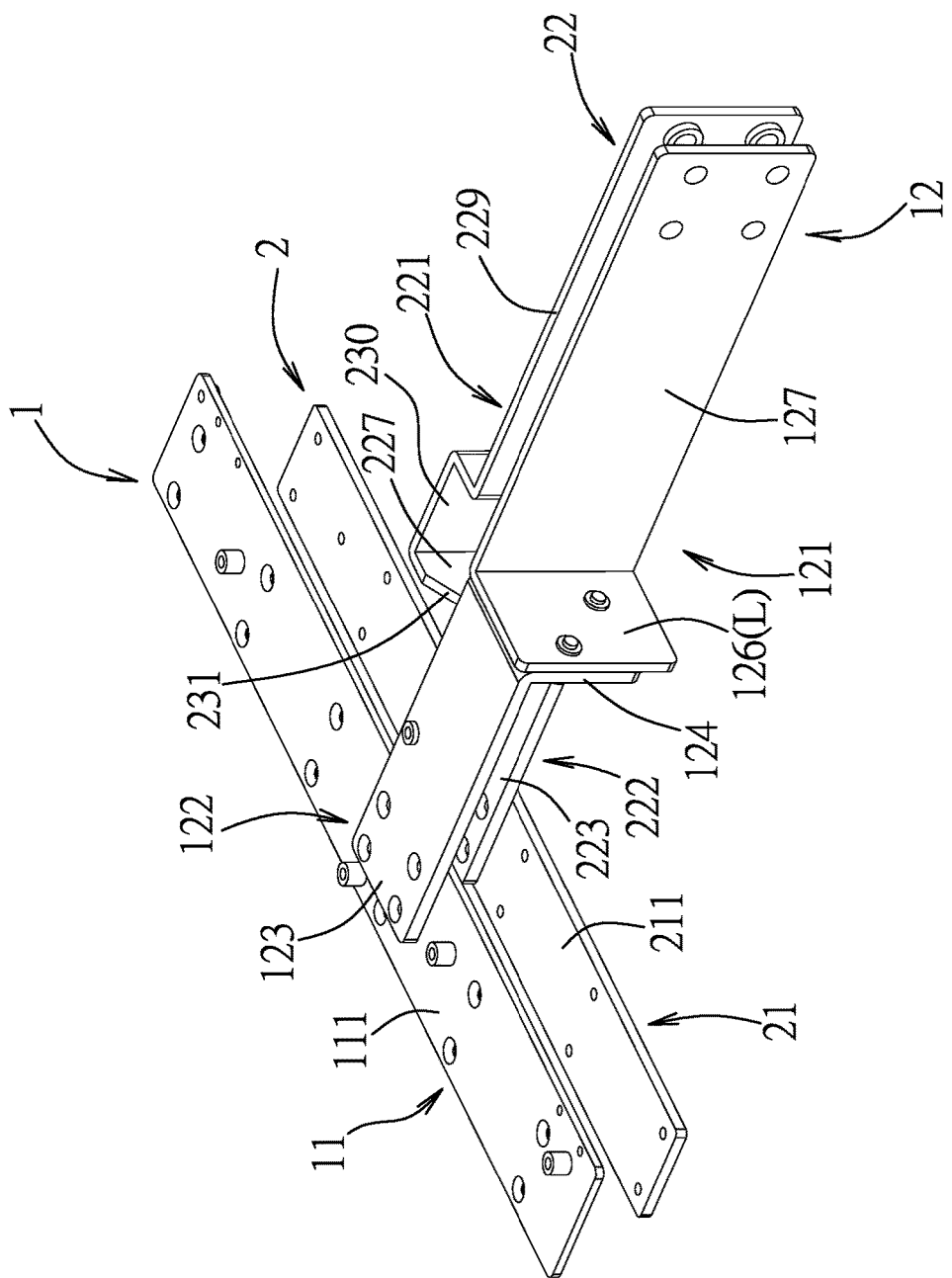
FIG. 10 is a perspective view of a busbar assembly according to a third embodiment of the present disclosure.
Figure 11:
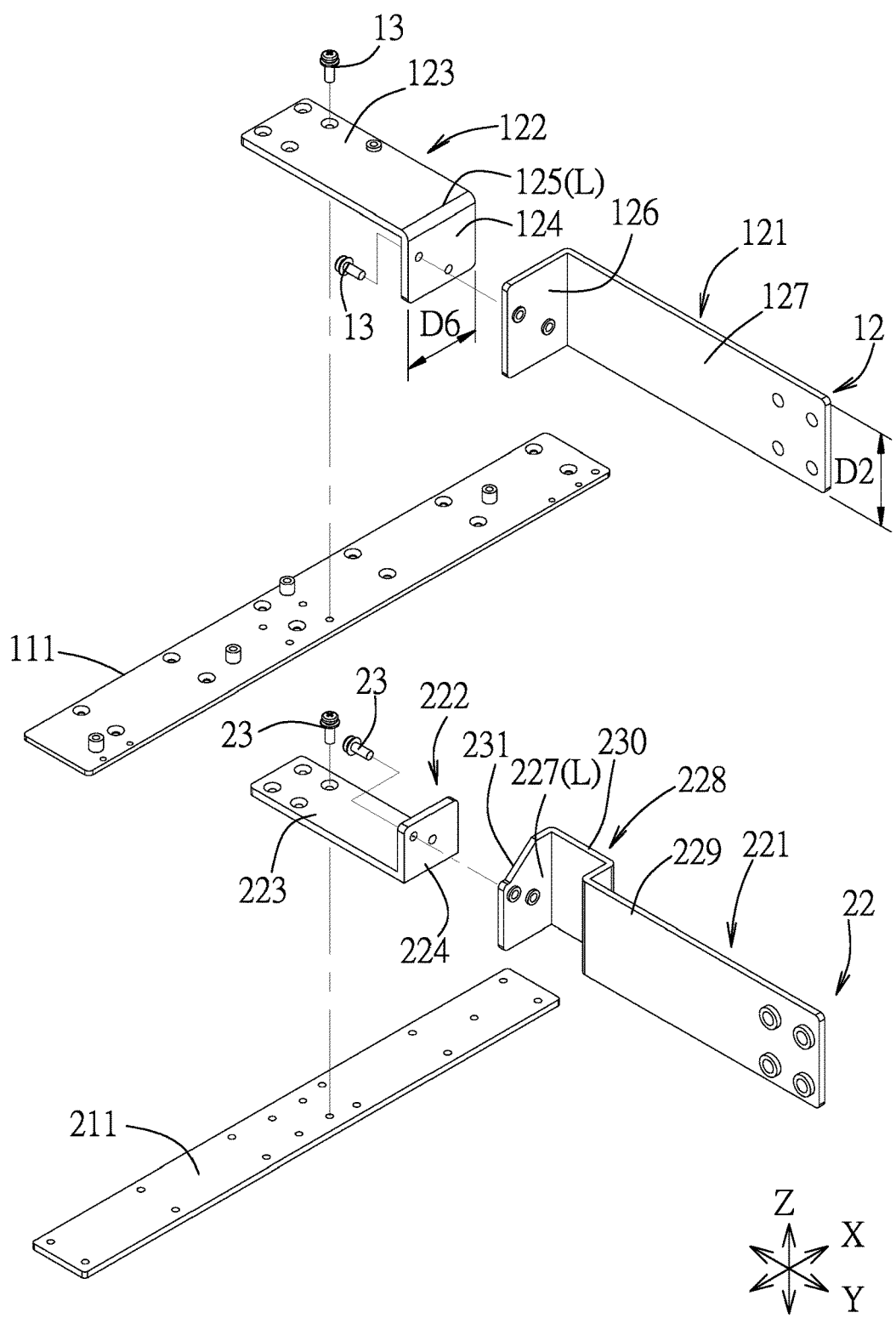
FIG. 11 is an exploded perspective view of FIG. 10.
Figure 12:
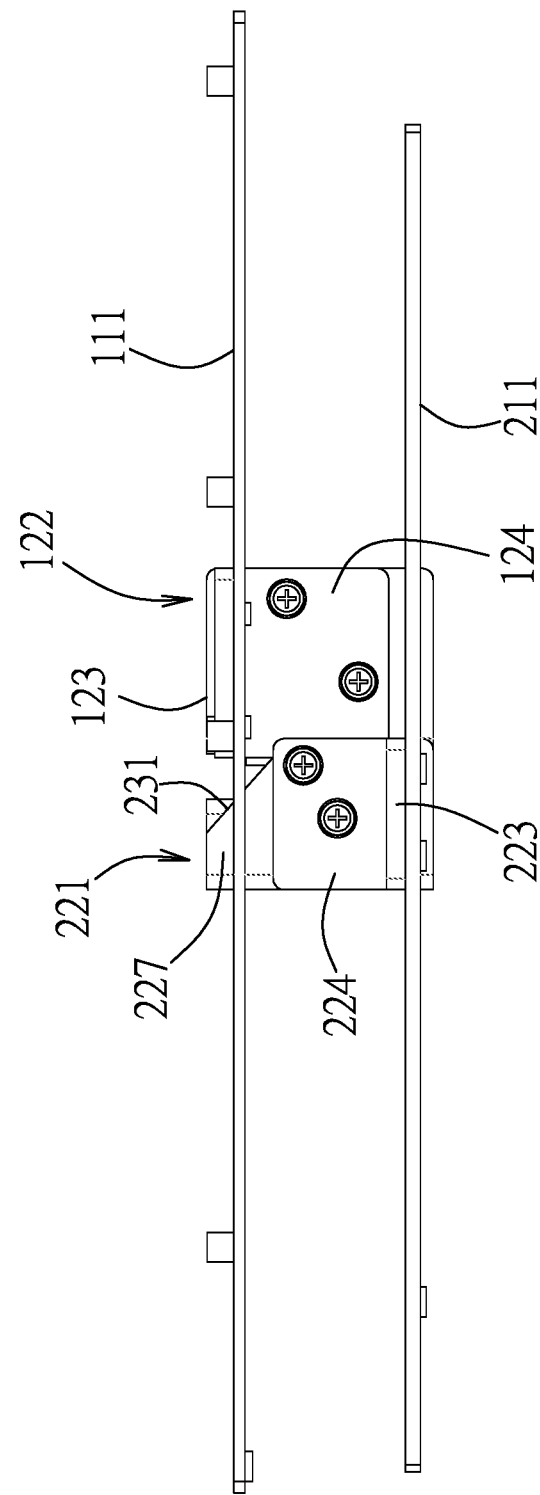
FIG. 12 is a front view of FIG. 10.

FIGS. 10 to 12 illustrate a busbar assembly 300 according to a third embodiment of the present disclosure, which is generally similar to the second embodiment. The differences of the third embodiment are described in detail as follows. The first transmission unit 11 includes a single transmission busbar 111 that is a horizontal plate made from a copper plate. Each of the connecting busbar 122 and the first output busbar 121 is bent into an L-shape. The connecting busbar 122 includes a horizontal connecting plate portion 123 and a vertical connecting plate portion 124. The horizontal connecting plate portion 123 is centrally located and secured to a top surface of the first transmission busbar 111 by a plurality of fasteners 13 (only one is shown in FIG. 11), so that the overlapping regions of the horizontal connecting plate portion 123 and the first transmission busbar 111 are electrically coupled to each other. The horizontal connecting plate portion 123 has a rear end 125 away from the first transmission busbar 111. The vertical connecting plate portion 124 bends downwardly from the rear end 125. The connecting busbar 122 is made from a copper plate by a bending process. As a result, the horizontal connecting plate portion 123 and the vertical connecting plate portion 124 have the uniform width (D6) in the left-right direction (X).

The first output busbar 121 includes a vertical first coupling portion 126 and a first extension portion 127 bending rearward from the vertical first coupling portion 126. The vertical first coupling portion 126 is secured to a rear face of the vertical connecting plate portion 124 by a plurality of fasteners 13 (only one is shown in FIG. 11), so that the overlapping regions of the vertical first coupling portion 126 and the vertical connecting plate portion 124 are electrically coupled to each other. In this embodiment, the first extension portion 127 extends away from the vertical connecting plate portion 124. The first output busbar 121 is made from a copper plate by a bending process. As a result, the vertical first coupling portion 126 and the first extension portion 127 have the uniform width (D2) in the top-bottom direction (Z).

By virtue of a bending process, the vertical second extension plate portion 228 of the second output busbar 221 in the third embodiment is formed into a vertical second extension plate segment 229, and a projecting plate segment 230 in the third embodiment. The projecting plate segment 230 projects from a front end of the vertical second extension plate segment 229 and extends away from the first output unit 12. The vertical second coupling plate portion 227 bends from a front end of the projecting plate segment 230 toward the first output unit 12, and is tailored to have a chamfer 231. The chamfer 231 is directed toward the horizontal connecting plate portion 123. Through the provision of the chamfer 231, the vertical second coupling plate portion 227 is prevented from interfering with the horizontal connecting plate portion 123 and allows the vertical second extension plate segment 229 to be located as close as possible to the first extension portion 127 in compliance with a gap between the main busbars 73 (see FIG. 3) inside the cabinet 7. As such, the first extension portion 127 and the vertical second extension plate segment 229 may be respectively connected to the main busbars 73. Further, because of the projecting plate segment 230, the vertical second coupling plate portion 227 may have a relatively large area, so that the vertical second coupling plate portion 227 may entirely overlap and contact the adaptor vertical plate portion 224. The currents may be smoothly transmitted from the adaptor vertical plate portion 224 to the vertical second coupling plate portion 227. If the vertical second coupling plate portion 227 merely has a small area to overlap and contact the adaptor vertical plate portion 224, the amount of the currents will decrease when flowing from a larger area to a small area, thereby adversely affecting the current transmitting efficiency.

By virtue of the connection of the connecting busbar 122 with the first transmission busbar 111 and the first output busbar 121, the first transmission busbars 111 can be coplanar, like the second transmission busbar 211. Accordingly, a gap between the first transmission busbars 111 and the second transmission busbar 211 can be further reduced. Compared with the second embodiment, the first transmission unit 11 and the second transmission unit 21 of the busbar assembly 300 can be disposed in a smaller and more limited space of the cabinet body 71 along the top-bottom direction (Z).

Figure 13:
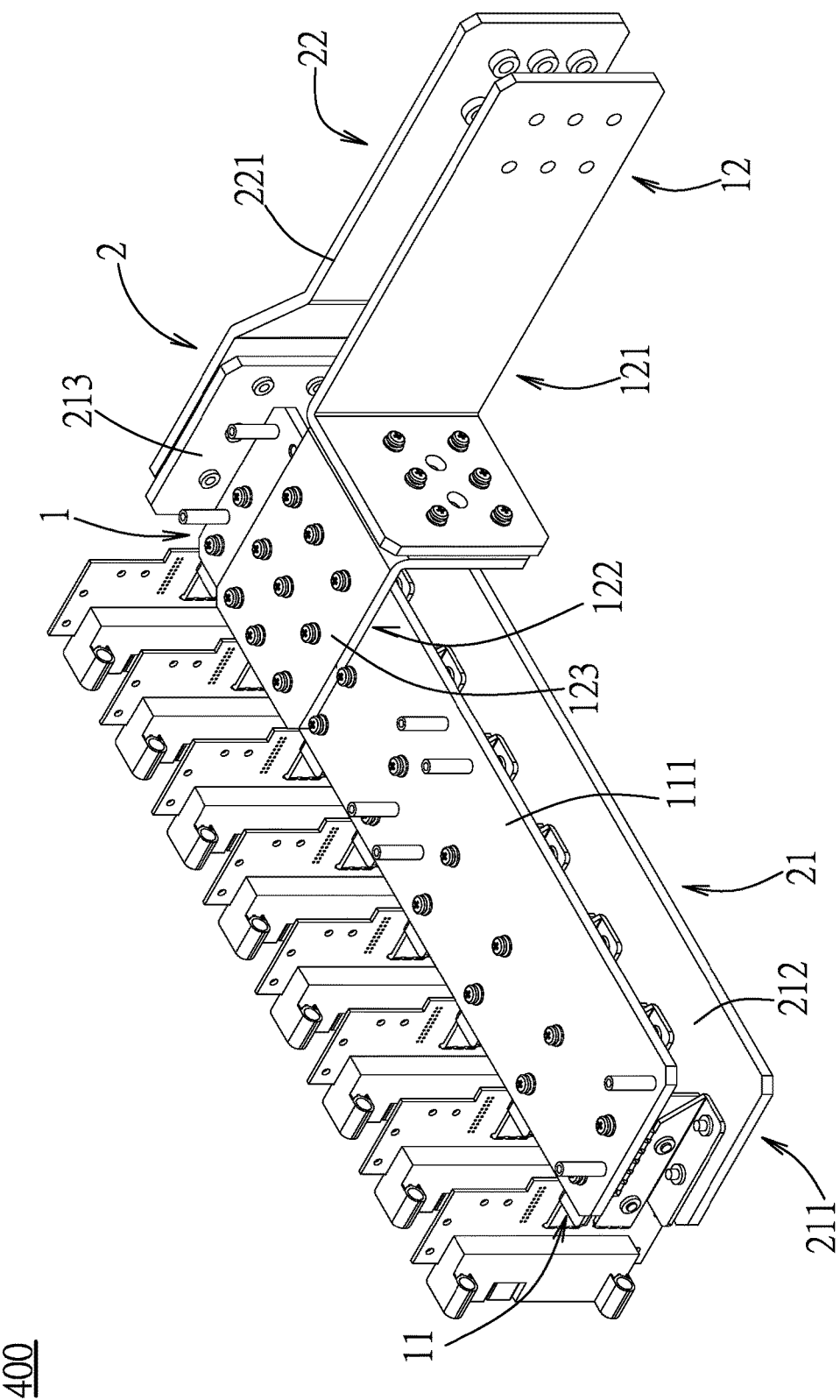
FIG. 13 is a perspective view of a busbar assembly according to a fourth embodiment of the present disclosure.
Figure 14:
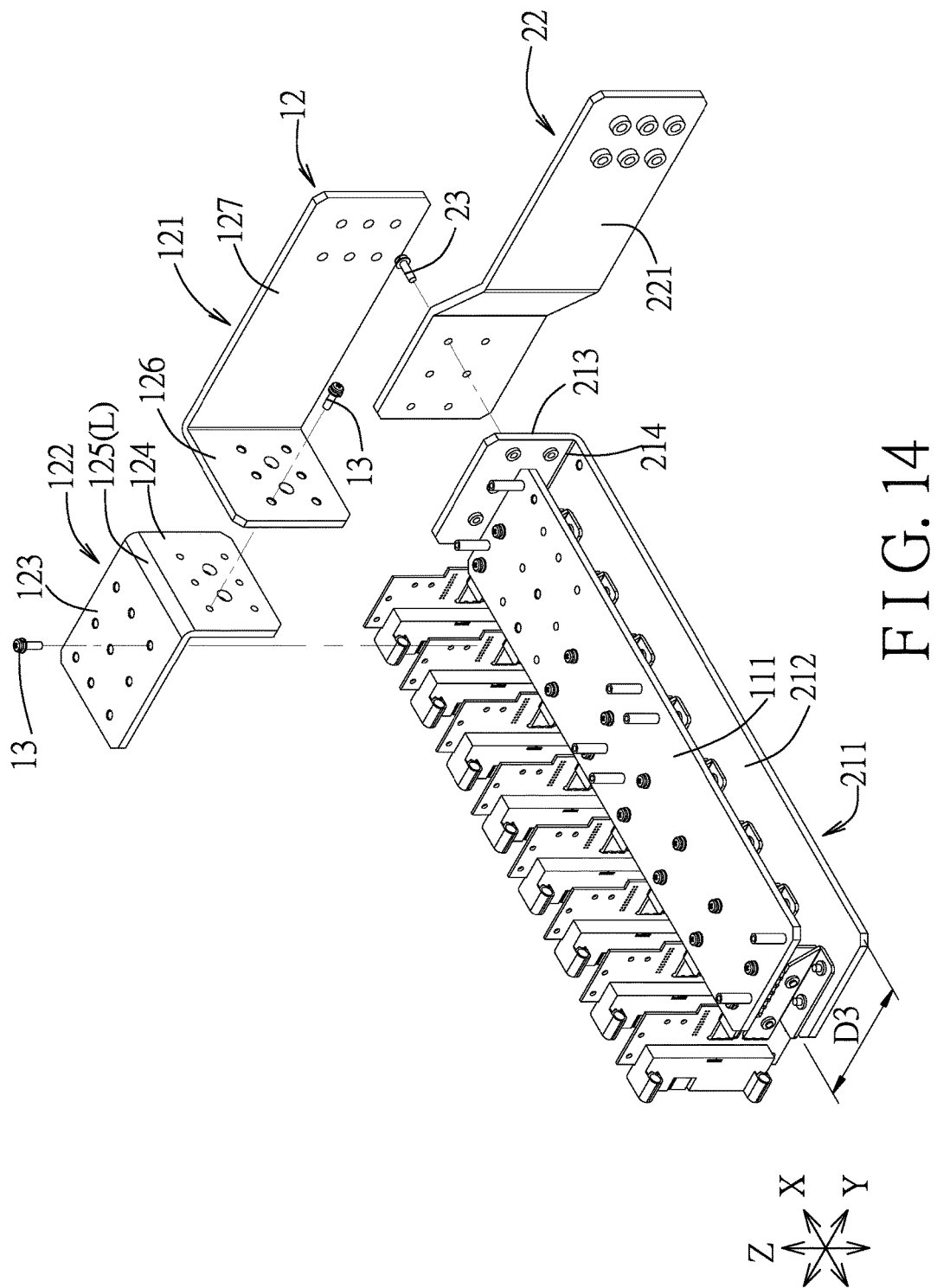
FIG. 14 is an exploded perspective view of FIG. 13.
Figure 15:
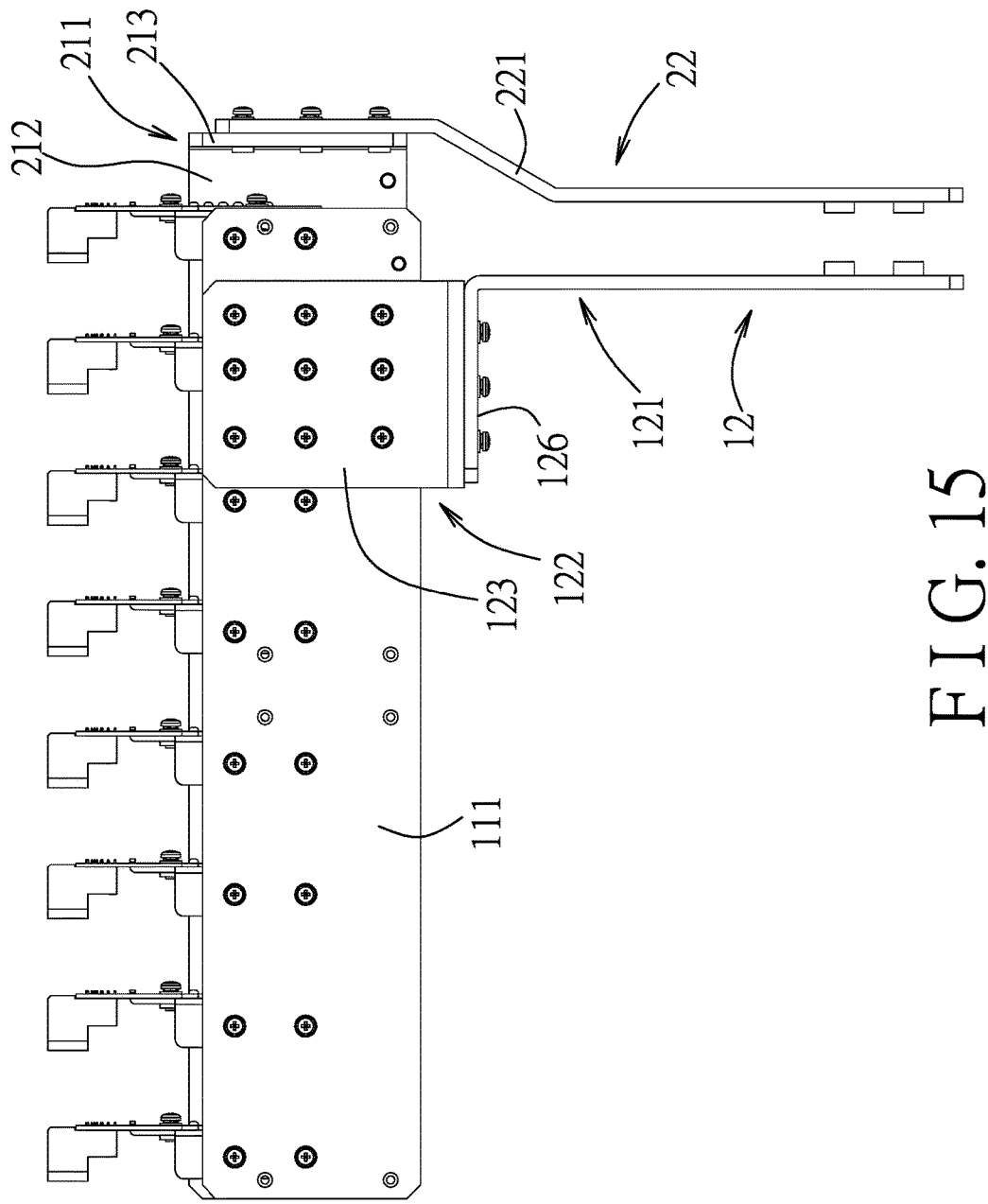
FIG. 15 is a top view of FIG. 13.

FIGS. 13 to 15 illustrate a busbar assembly 400 according to a fourth embodiment of the present disclosure, which is generally similar to the third embodiment. The differences of the fourth embodiment are described in detail as follows. The second transmission busbar 211 is bent into an L-shape, and includes a second horizontal plate portion 212 and a second vertical plate portion 213. The second horizontal plate portion 212 is elongated lengthwise and horizontally along the left-right direction (X) and has a short side 214. The second vertical plate portion 213 bends upwardly from the short side 214. The second transmission busbar 211 is made from a copper plate by a bending process, so that the second horizontal plate portion 212 and the second vertical plate portion 213 have a uniform width (D3) in the front-rear direction (Y). The second output busbar 221 has a central portion which bends twice in an inclined manner, so that the front and rear portions of the second output busbar 221 are parallel with each other. The front portion of the second output busbar 221 is secured to an outer surface of the second vertical plate portion 213 by a plurality of fasteners 23 (only one is shown in FIG. 14), so that the overlapping regions of the second output busbar 221 and the second vertical plate portion 213 are electrically coupled to each other. The rear portion of the second output busbar 221 is disposed proximally to the first output busbar 121. In this embodiment, the horizontal connecting plate portion 123 is secured to a top surface of the first transmission busbar 111 in proximity to the second vertical plate portion 213, so that the first output busbar 121 maybe located as close as possible to the second output busbar 221 incompliance with the gap between the main busbars 73.

Because the first output busbar 121 is connected to one side of the first transmission busbar 111, and because the second output busbar 221 is connected to one side of the second transmission busbar 211, the first output busbar 121 and the second output busbar 221 may be matched with two main busbars 73 disposed in proximity to one side of the cabinet 71.

Figure 16:
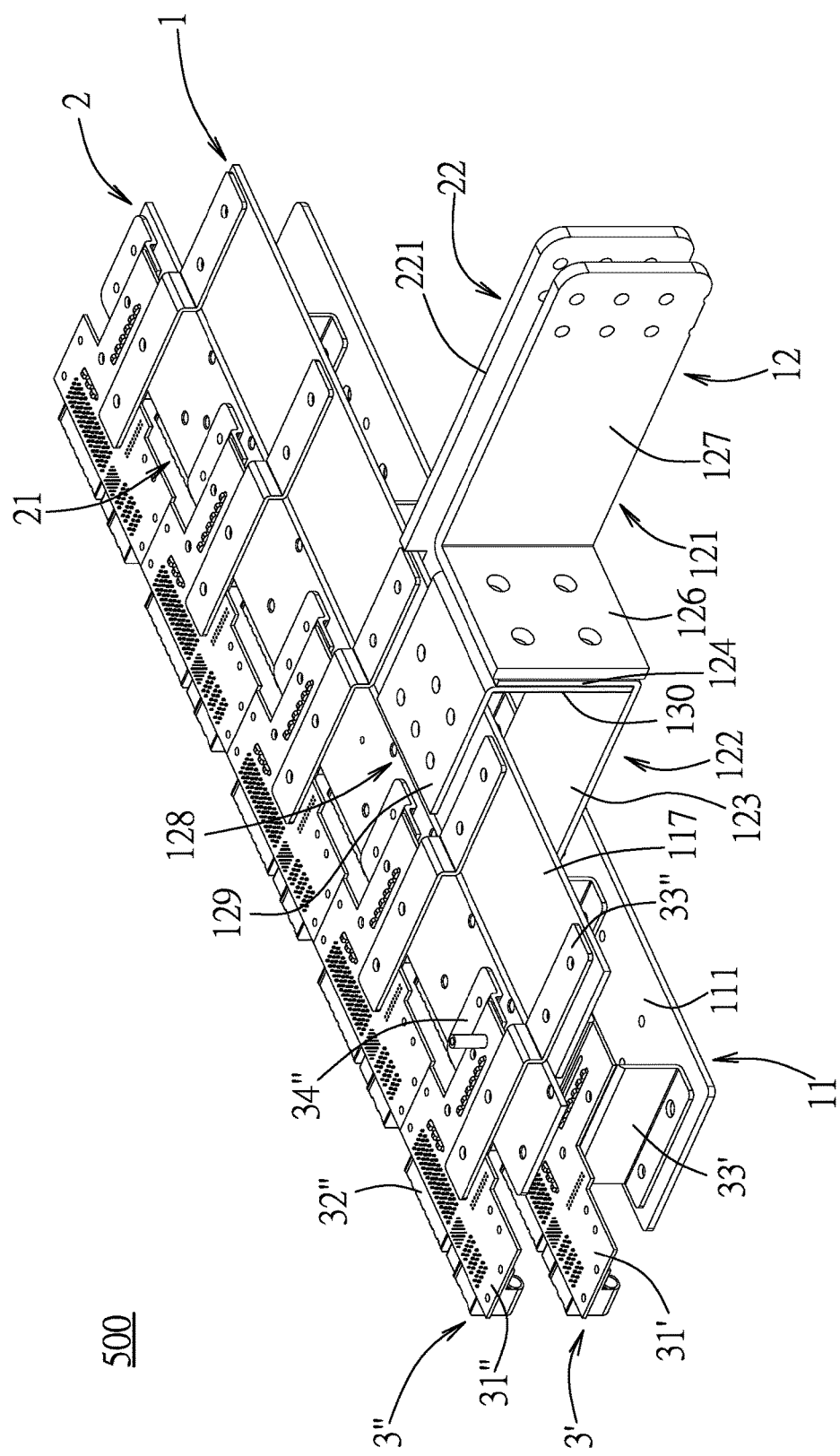
FIG. 16 is a perspective view of a busbar assembly according to a fifth embodiment of the present disclosure.
Figure 17:
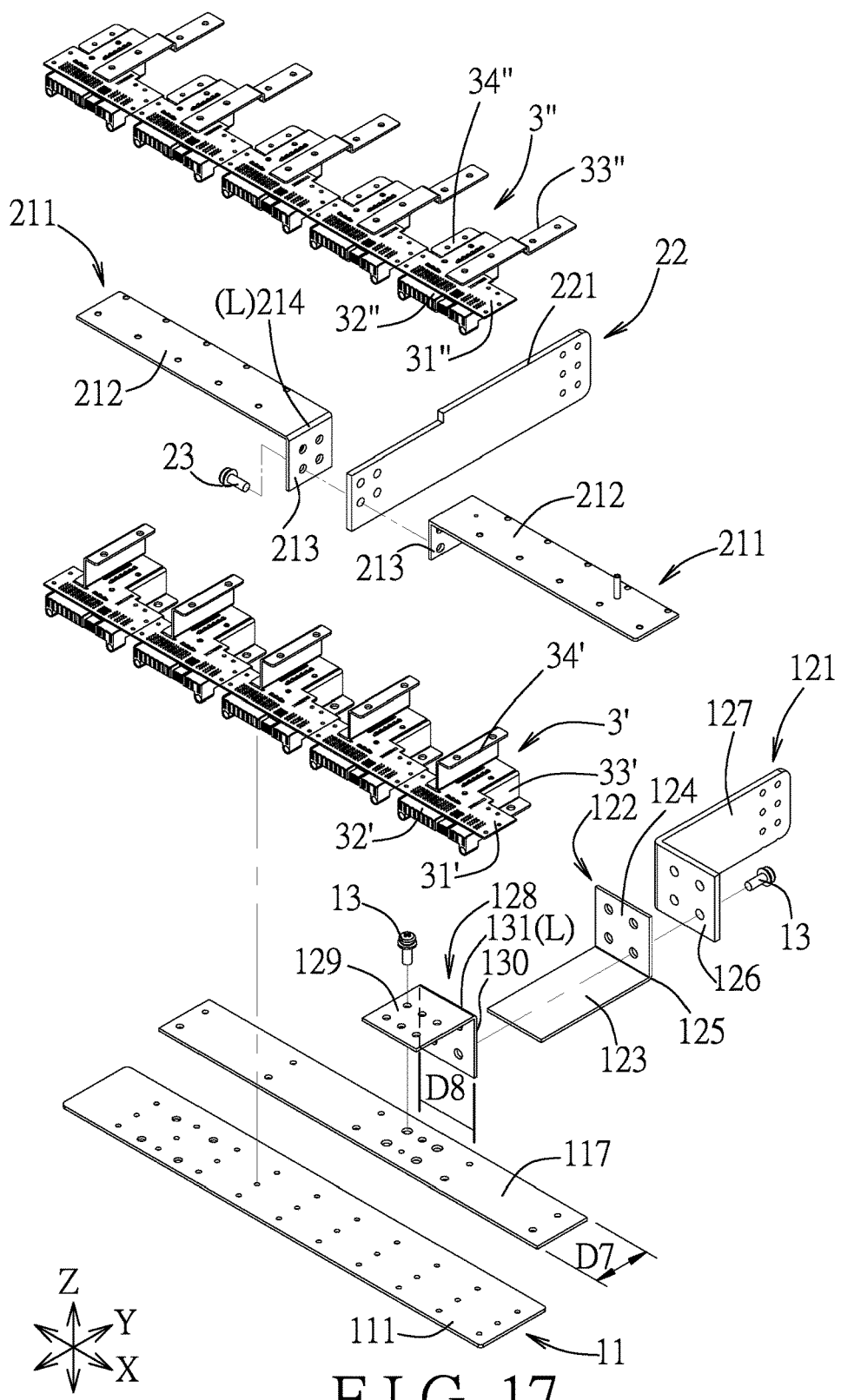
FIG. 17 is an exploded perspective view of the busbar assembly of the fifth embodiment.
Figure 18:
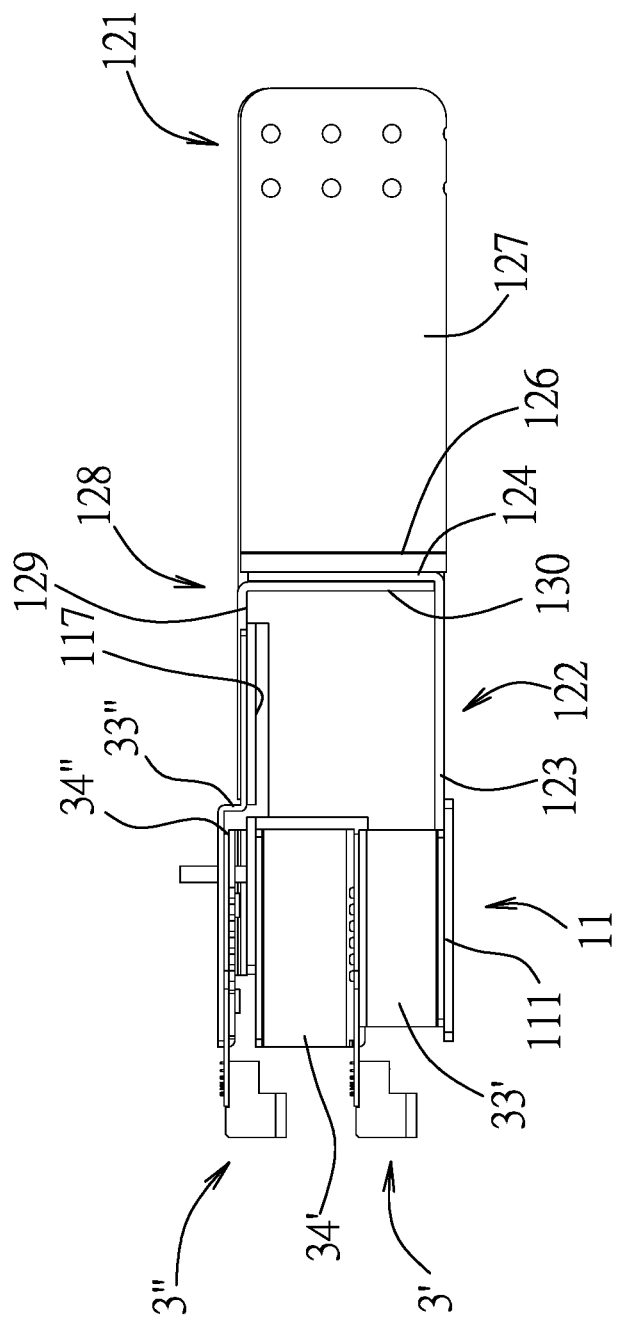
FIG. 18 is a side view of the busbar assembly of the fifth embodiment.

FIGS. 16 to 18 illustrate a busbar assembly 500 according to a fifth embodiment of the present disclosure, which is generally similar to the fourth embodiment. The differences of the fifth embodiment are described in detail as follows.

In this embodiment, each of the electronic connector assemblies 3', 3" is arranged in a horizontally lying position. Because the cabinet 7 has a limited width in the left-right direction (X), the busbar assembly 500 is arranged to include a row of lower electronic connector assemblies 3', and a row of upper electronic connector assemblies 3" arranged in the cabinet 7 in the left-right direction (X). The upper electronic connector assemblies 3" are located above the lower electronic connector assemblies 3'. The circuit boards 31' and the electrical connectors 32' of the lower electronic connector assemblies 3' and the circuit boards 31" and the electrical connectors 32" of the upper electronic connector assemblies 3" are placed horizontally in the left-right direction (X). For each lower electronic connector assembly 3', the first conductive plate 33' and the second conductive plate 34' are respectively disposed on the bottom and top sides of the circuit board 31'. For each upper electronic connector assembly 3", the first conductive plate 33" is disposed on a top side of the circuit board 31" and is elongated lengthwise in the front-rear direction (Y), and the second conductive plate 34" is disposed on a bottom side of the circuit board 31".

The first transmission busbar 111 is disposed below the second transmission unit 21 in a spaced apart manner. The first conductive plates 33' are secured to the top surface of the first transmission busbar 111. The first transmission unit 11 further includes a third transmission busbar 117 formed as a horizontal plate that is elongated lengthwise along the left-right direction (X) and that is located slightly rearward from and below the second transmission unit 21 in a spaced apart manner. The third transmission busbar 117 is made from a copper plate by a bending process, and has a uniform width (D7) in the front-rear direction (Y). The first conductive plates 33" are secured to a top surface of the third transmission busbar 117.

The horizontal connecting plate portion 123 of the connecting busbar 122 is connected to the top surface of the first transmission busbar 111. The vertical connecting plate portion 124 bends upwardly from the rear end 125 of the horizontal connecting plate portion 123. The lower electronic connector assemblies 3' may transmit the positive currents to the first output busbar 121 through the first transmission busbar 111 and the connecting busbar 122. The first output unit 12 further includes a first output adaptor busbar 128 bent into an L-shape. The first output adaptor busbar 128 includes an adaptor horizontal plate portion 129 and an adaptor vertical plate portion 130. The adaptor horizontal plate portion 129 is secured to the third transmission busbar 117 by a plurality of fasteners 13 (only one is shown in FIG. 17) and has a rear end 131 distal from the third transmission busbar 117. The adaptor vertical plate portion 130 bends downwardly from the rear end 131 of the adaptor horizontal plate portion 129 and is secured to the vertical connecting plate portion 124 of the connecting busbar 122 by a plurality of fasteners 13 (only one is shown in FIG. 17). The first output adaptor busbar 128 is made from a rectangular copper plate by a bending process so that the adaptor horizontal plate portion 129 and the adaptor vertical plate portion 130 has a uniform width (D8) in the left-right direction (X). With use of the third transmission busbar 117 and the first output adaptor busbar 128, the upper electronic connector assemblies 3" may transmit the positive currents to the first output busbar 121 through the third transmission busbar 117, the first output adaptor busbar 128 and the connecting busbar 122.

Figure 19:
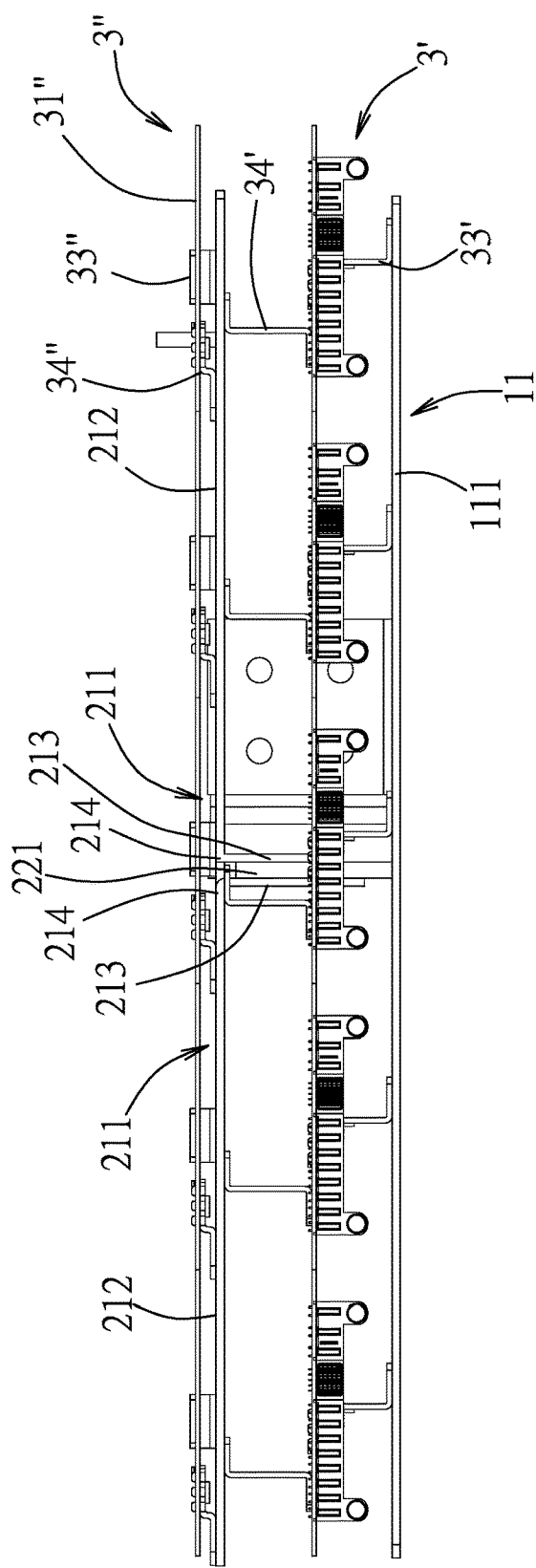
FIG. 19 is a front view of the busbar assembly of the fifth embodiment.

Referring to FIG. 19, in combination with FIGS. 16 and 17, the second transmission unit 21 includes two second transmission busbars 211 that are spaced apart from each other in the left-right direction (X) and that are located above the first transmission busbar 111 in a spaced apart manner. Each second transmission busbar 211 is bent into an L-shape. The short sides 214 of the second transmission busbars 211 are proximate to each other. The second vertical plate portions 213 of the second transmission busbars 211 respectively bend downwardly from the short sides 214 and are respectively secured to two opposite sides of the second output busbar 221 by a plurality of fasteners 23 (Only one is shown in FIG. 17). The second conductive plates 34' of the lower electronic connector assembly 3' are secured to bottom surfaces of the second horizontal plate portions 212 of the second transmission busbars 211. The second conductive plates 34" of the upper electronic connector assembly 3" are secured to top surfaces of the second horizontal plate portions 212 of the second transmission busbars 211. As such, the lower and upper electronic connector assemblies 3', 3" may transmit the negative currents to the second output busbar 221 through the second transmission busbars 211.

Alternatively, the upper electronic connector assemblies 3", the third transmission busbar 117 and the first output adaptor busbar 128 may be omitted, or the lower electronic connector assemblies 3' and the connecting busbar 122 may be omitted, and the adaptor vertical plate portion 130 of the first output adaptor busbar 128 may be directly secured to the vertical first coupling portion 126 of the first output busbar 121.

Figure 20:
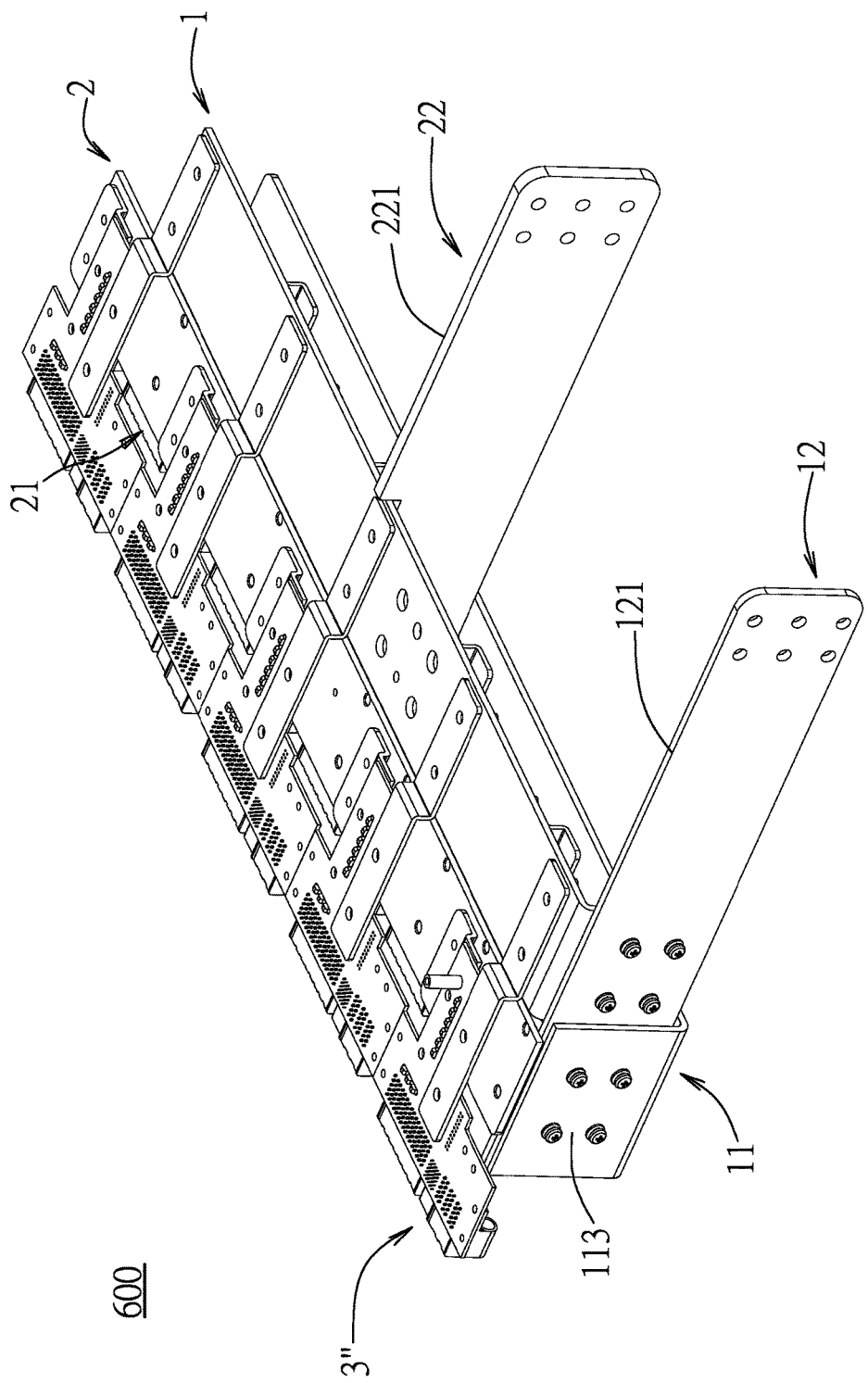
FIG. 20 is a perspective view of a busbar assembly according to a sixth embodiment of the present disclosure.
Figure 21:
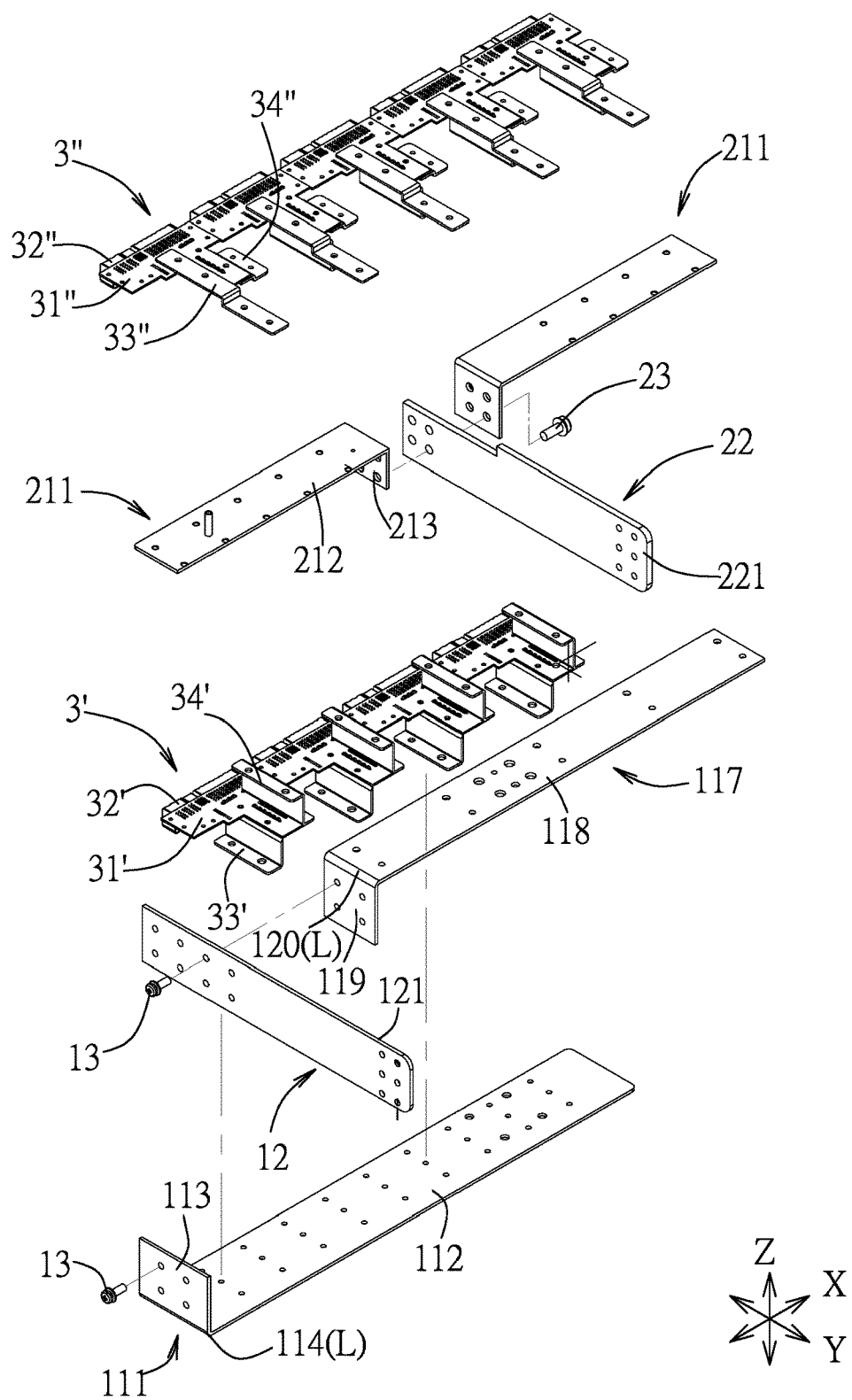
FIG. 21 is an exploded perspective view of the busbar assembly of the sixth embodiment.
Figure 22:
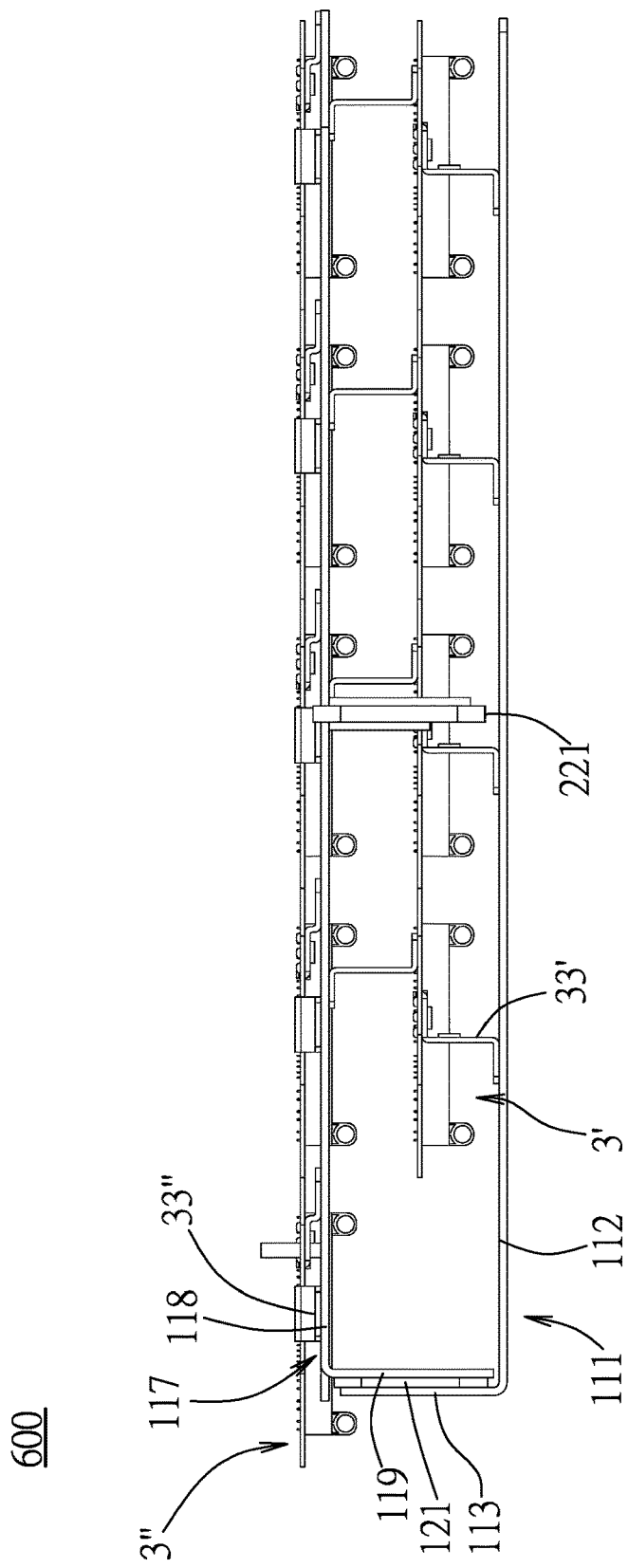
FIG. 22 is a rear view of the busbar assembly of the sixth embodiment.

FIGS. 20 to 22 illustrate a busbar assembly 600 according to a sixth embodiment of the present disclosure, which is generally similar to the fifth embodiment. The differences of the fifth embodiment are described in detail as follows.

The first transmission unit 11 includes a first transmission busbar 111 that is bent into an L-shape. The first vertical plate portion 113 bends upwardly from the short side 114 of the first horizontal plate portion 112. The first conductive plates 33' of the lower electronic connector assemblies 3' are secured to a top surface of the first horizontal plate portion 112. The third transmission busbar 117 is made from a copper plate, is bent into an L-shape, and has a third horizontal plate portion 118 and a third vertical plate portion 119. The third horizontal plate portion 118 is elongated lengthwise along the left-right direction (X) and is located rearwardly from the second transmission busbars 211 in a spaced apart manner, and has a short side 120. The third vertical plate portion 119 bends downwardly from the short side 120 of the third horizontal plate portion 118. The first conductive plates 33" of the upper electronic connector assemblies 3" are secured to a top surface of the third horizontal plate portion 118. The first vertical plate portion 113 and the third vertical plate portion 119 are respectively secured to opposite left and right vertical sides of the first output busbar 121 by a plurality of fasteners 13 (only two are shown in FIG. 21). As such, the overlapping regions of the first vertical plate portion 113 and the first output busbar 121 are electrically coupled to each other, and the overlapping regions of the third vertical plate portion 119 and the first output busbar 121 are electrically coupled to each other.

In this embodiment, the first output busbar 121 is proximate to one side of the first transmission busbar 111, and the second output busbar 221 is proximate to a middle of the second transmission unit 21 (i.e., the junction of the two second transmission busbars 211). As such, the first output busbar 121 and the second output busbar 221 may respectively be matched with the main busbar 73 proximate to one side of the cabinet 7 and the other busbar 73 disposed at the middle of the cabinet 71.

To sum up, in the busbar assemblies 100 to 600 of the present disclosure, all of the first transmission busbars 111, 111', the third transmission busbar 117, the second transmission busbars 211, the first output busbar 121 and the second output busbar 221, the connecting busbar 122, the first output adaptor busbar 128, and the second output adaptor busbar 222 are directly made from rectangular copper plates by bending processes. Accordingly, at least the first transmission busbar 111, the first output busbar 121, the second transmission busbars 211 and the second output busbar 221 may respectively have the uniform widths to effectively transmit high currents. Compared to the prior art described hereinbefore, the busbar assemblies of the present disclosure save the manufacture and material costs because the manufacture thereof dispenses with the tailoring process required in the prior art, and thus eliminates the problem of scrap formation due to tailoring.

In the description above, for the purposes of explanation, numerous specific details have been set forth in order to provide a thorough understanding of the embodiments. It will be apparent, however, to one skilled in the art, that one or more other embodiments may practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A busbar assembly, comprising:
  a first busbar subassembly including
    a first transmission unit including at least one first transmission busbar that is elongated lengthwise along a left-right direction and that lies in a horizontal plane, said at least one first transmission busbar having a uniform width, and
    a first output unit connected to said at least one first transmission busbar and including a first output busbar that is elongated lengthwise along a front-rear direction and that lies in a vertical plane, said first output busbar having a uniform width, said first transmission unit having a bent structure formed with a bend line perpendicular to a line of a lengthwise direction thereof; and a second busbar subassembly including
   a second transmission unit spaced apart from said first transmission unit in a top-bottom direction, and including at least one second transmission busbar that is elongated lengthwise along the left-right direction and that lies in a horizontal plane, said at least one second transmission busbar having a uniform width, and
   a second output unit connected to said at least one second transmission busbar, and including a second output busbar that is elongated lengthwise along the front-rear direction and that lies in a vertical plane, said second output busbar having a uniform width, one of said second transmission unit and said second output unit having a bent structure formed with a bend line perpendicular to a line of a lengthwise direction thereof;
   wherein said at least one first transmission busbar has the bent structure bent into an L-shape, and includes a first horizontal plate portion and a first vertical plate portion, said first horizontal plate portion extending lengthwise in the left-right direction and having a short side, said first vertical plate portion bending perpendicularly from said short side, said first vertical plate portion being connected to said first output unit; and
   wherein said at least one first transmission busbar includes two first transmission busbars space apart from each other in the left-right direction.

2. The busbar assembly as claimed in claim 1, wherein said short sides of said two first transmission busbars are proximate to each other, said first vertical plate portions of said two first transmission busbars bending downwardly and respectively from said short side, said first output busbar being a vertical plate, said first vertical plate portions of said two first transmission busbars being respectively connected to two opposite vertical sides of said first output busbar.

3. The busbar assembly as claimed in claim 1, further comprising a plurality of spaced-apart electronic connector assemblies located between said at least one first transmission busbar and said at least one second transmission busbar.

4. A busbar assembly, comprising:
a first busbar subassembly including
   a first transmission unit including at least one first transmission busbar that is elongated lengthwise along a left-right direction and that lies in a horizontal plane, said at least one first transmission busbar having a uniform width, and
   a first output unit connected to said at least one first transmission busbar and including a first output busbar that is elongated lengthwise along a front-rear direction and that lies in a vertical plane, said first output busbar having a uniform width, one of said first transmission unit and said first output unit having a bent structure formed with a bend line perpendicular to a line of a lengthwise direction thereof; and
a second busbar subassembly including
   a second transmission unit spaced apart from said first transmission unit in a top-bottom direction, and including at least one second transmission busbar that is elongated lengthwise along the left-right direction and that lies in a horizontal plane, said at least one second transmission busbar having a uniform width, and
   a second output unit connected to said at least one second transmission busbar, and including a second output busbar that is elongated lengthwise along the front-rear direction and that lies in a vertical plane, said second output busbar having a uniform width, said second output unit having a bent structure formed with a bend line perpendicular to a line of a lengthwise direction thereof;
   wherein said at least one second transmission busbar is a horizontal plate, said second output unit further including a second output adaptor busbar having the bent structure, said second output adaptor busbar being bent into an L-shape and connected to said at least one second transmission busbar and said second output busbar;
   wherein said at least one second transmission busbar is located below said first transmission unit in a space apart manner, said second output adaptor busbar including an adaptor horizontal plate portion and an adaptor vertical plate portion, said adaptor horizontal plate portion being connected to a top surface of said at least one second transmission busbar and having a lateral side extending along the front-rear direction, said adaptor vertical plate portion bending upwardly from said lateral side, said second output busbar being a vertical plate connected to said adaptor vertical plate portion.

5. A cabinet, comprising:
a cabinet body having an accommodating space opening at a front end of said cabinet body;
two main busbars disposed in said accommodating space in proximity to a rear end of said cabinet body and connected to said cabinet body, each of said main busbars being elongated lengthwise along a top-bottom direction; and
a centralized power supply module disposed in said accommodating space and connected to said cabinet body, said centralized power supply module including a busbar assembly that includes
   a first busbar subassembly including a first transmission unit and a first output unit, said first transmission unit including at least one first transmission busbar that is elongated lengthwise along a left-right direction, that lies in a horizontal plane, and that has a uniform width, said first output unit being connected to said at least one first transmission busbar and including a first output busbar that is elongated lengthwise along a front-rear direction, that lies in a vertical plane, and that has a uniform width, said first output busbar being electrically coupled to one of said main busbars, said first transmission unit having a bent structure provided with a bend line perpendicular to a line of a lengthwise direction thereof, and
   a second busbar subassembly including a second transmission unit and a second output unit, said second transmission unit being disposed spaced apart from said first transmission unit in the top-bottom direction, and including at least one second transmission busbar that is elongated lengthwise along the left-right direction, that lies in a horizontal plane, and that has a uniform width, said second output unit being connected to said at least one second transmission busbar, and including a second output busbar that is elongated lengthwise along the front-rear direction, that lies in a vertical plane, and that has a uniform width, said second output busbar being electrically coupled to another one of said main busbars, one of said second transmission unit and said second output unit having a bent structure provided with a bend line perpendicular to a line of lengthwise direction thereof;

wherein said at least one first transmission busbar has the bent structure bent into an L-shape, and includes a first horizontal plate portion and a first vertical plate portion, said first horizontal plate portion extending lengthwise in the left-right direction and having a short side, said first vertical plate portion bending perpendicularly from said short side, said first vertical plate portion being connected to said first output unit; and wherein said at least one first transmission busbar includes two first transmission busbars spaced apart from each other in the left-right direction.

6. A cabinet, comprising:

a cabinet body having an accommodating space opening at a front end of said cabinet body;

two main busbars disposed in said accommodating space in proximity to a rear end of said cabinet body and connected to said cabinet body, each of said main busbars being elongated lengthwise along a top-bottom direction; and a centralized power supply module disposed in said accommodating space and connected to said cabinet body, said centralized power supply module including a busbar assembly that includes a first busbar subassembly including a first transmission unit and a first output unit, said first transmission unit including at least one first transmission busbar that is elongated lengthwise along a left-right direction, that lies in a horizontal plane, and that has a uniform width, said first output unit being connected to said at least one first transmission busbar and including a first output busbar that is elongated lengthwise along a front-rear direction, that lies in a vertical plane, and that has a uniform width, said first output busbar being electrically coupled to one of said main busbars, one of said first transmission unit and said first output unit having a bent structure provided with a bend line perpendicular to a line of a lengthwise direction thereof, and a second busbar subassembly including a second transmission unit and a second output unit, said second transmission unit being disposed spaced apart from said first transmission unit in the top-bottom direction, and including at least one second transmission busbar that is elongated lengthwise along the left-right direction, that lies in a horizontal plane, and that has a uniform width, said second output unit being connected to said at least one second transmission busbar, and including a second output busbar that is elongated lengthwise along the front-rear direction, that lies in a vertical plane, and that has a uniform width, said second output busbar being electrically coupled to another one of said main busbars, said second output unit having a bent structure provided with a bend line perpendicular to a line of a lengthwise direction thereof;

wherein said at least one second transmission busbar is a horizontal plate, said second output unit further including a second output adaptor busbar having the bent structure, said second output adaptor busbar being bent into an L-shape and connected to said at least one second transmission busbar and said second output busbar;

wherein said at least one second transmission busbar is located below said first transmission unit in a spaced apart manner, said second output adaptor busbar including an adaptor horizontal plate portion and an adaptor vertical plate portion, said adaptor horizontal plate portion being connected to a top surface of said at least one second transmission busbar and having a lateral side extending along the front-rear direction, said adaptor vertical plate portion bending upwardly from said lateral side, said second output busbar being a vertical plate connected to said adaptor vertical plate portion.

* * * * *